(12) United States Patent
Park et al.

(10) Patent No.: US 9,477,343 B2
(45) Date of Patent: Oct. 25, 2016

(54) METHOD FOR MOVING CONTENTS AND ELECTRONIC DEVICE THEREOF

(71) Applicant: Samsung Electronics Co. Ltd., Suwon-si, Gyeonggi-do (KR)

(72) Inventors: Chan-Woo Park, Seongnam-si (KR); Nam-Hoi Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 427 days.

(21) Appl. No.: 13/944,217

(22) Filed: Jul. 17, 2013

(65) Prior Publication Data

US 2014/0043298 A1   Feb. 13, 2014

(30) Foreign Application Priority Data

Aug. 13, 2012  (KR) ........................ 10-2012-0088384

(51) Int. Cl.
  *G06F 3/041*   (2006.01)
  *G06F 1/16*    (2006.01)
  *G06F 3/01*    (2006.01)
  *G06F 3/0488*  (2013.01)

(52) U.S. Cl.
  CPC .......... *G06F 3/0416* (2013.01); *G06F 1/1643* (2013.01); *G06F 1/1686* (2013.01); *G06F 1/1694* (2013.01); *G06F 3/017* (2013.01); *G06F 3/04883* (2013.01); *G06F 2203/04808* (2013.01)

(58) Field of Classification Search
  CPC ...... G06F 3/0416; G06F 3/041; G06F 3/044; G06F 3/017; G06F 3/04883; G06F 1/1643; G06F 1/1686; G06F 1/1694
  See application file for complete search history.

(56) References Cited

U.S. PATENT DOCUMENTS

| | | | | |
|---|---|---|---|---|
| 5,512,979 | A  * | 4/1996 | Ogura | 399/8 |
| 6,075,520 | A  * | 6/2000 | Inoue et al. | 345/173 |
| 6,200,814 | B1 * | 3/2001 | Malmqvist et al. | 436/52 |
| 8,890,827 | B1 * | 11/2014 | Nordstrom et al. | 345/173 |
| 2005/0104867 | A1 | 5/2005 | Westerman et al. | |
| 2006/0159345 | A1 * | 7/2006 | Clary et al. | 382/186 |
| 2007/0152981 | A1 * | 7/2007 | Im et al. | 345/173 |
| 2007/0252821 | A1 * | 11/2007 | Hollemans et al. | 345/173 |
| 2008/0267745 | A1 * | 10/2008 | Schiller | 414/222.02 |
| 2010/0287513 | A1 | 11/2010 | Singh et al. | |
| 2011/0102332 | A1 | 5/2011 | Birnbaum et al. | |
| 2011/0148796 | A1 * | 6/2011 | Hollemans et al. | 345/173 |
| 2011/0219340 | A1 * | 9/2011 | Pathangay et al. | 715/863 |
| 2012/0278031 | A1 * | 11/2012 | Oda et al. | 702/150 |
| 2013/0141344 | A1 * | 6/2013 | Oh | 345/173 |
| 2013/0254900 | A1 * | 9/2013 | Sathish et al. | 726/28 |
| 2013/0265251 | A1 * | 10/2013 | Arakawa | 345/173 |
| 2014/0253465 | A1 * | 9/2014 | Hicks et al. | 345/173 |
| 2014/0331158 | A1 * | 11/2014 | Hicks et al. | 715/769 |

* cited by examiner

*Primary Examiner* — Fred Tzeng
(74) *Attorney, Agent, or Firm* — Jefferson IP Law, LLP

(57) ABSTRACT

A method for moving content and an electronic device thereof is provided. The method includes detecting at least two touches, selecting content corresponding to locations at which the at least two touches are detected, detecting a combined shape of touch entities corresponding to the at least two touches if the detected at least two touches are released, and moving the selected content to a location at which the combined shape of the detected at least two touch entities is changed, wherein the touch entities include at least one of a user's finger, a stylus pen, and an extra touch tool.

20 Claims, 22 Drawing Sheets

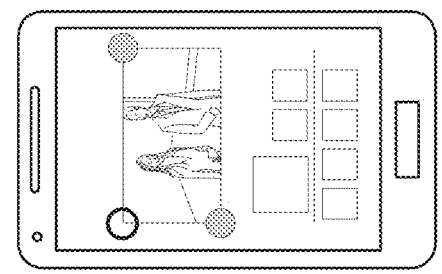
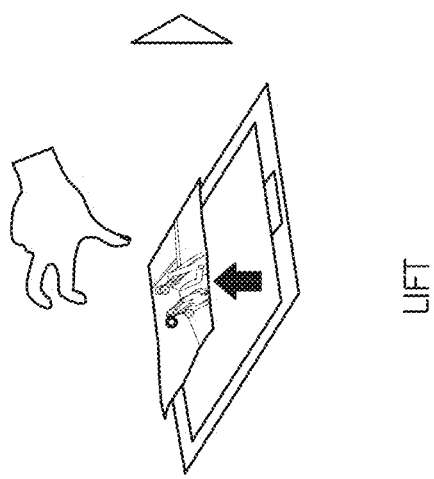
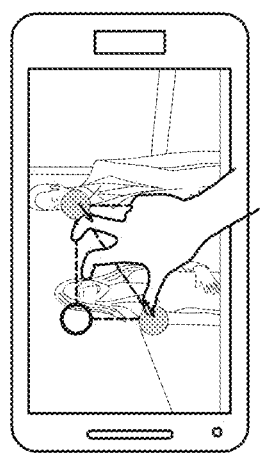
FIG.1A GRAB
FIG.1B LIFT
FIG.1C RELEASE

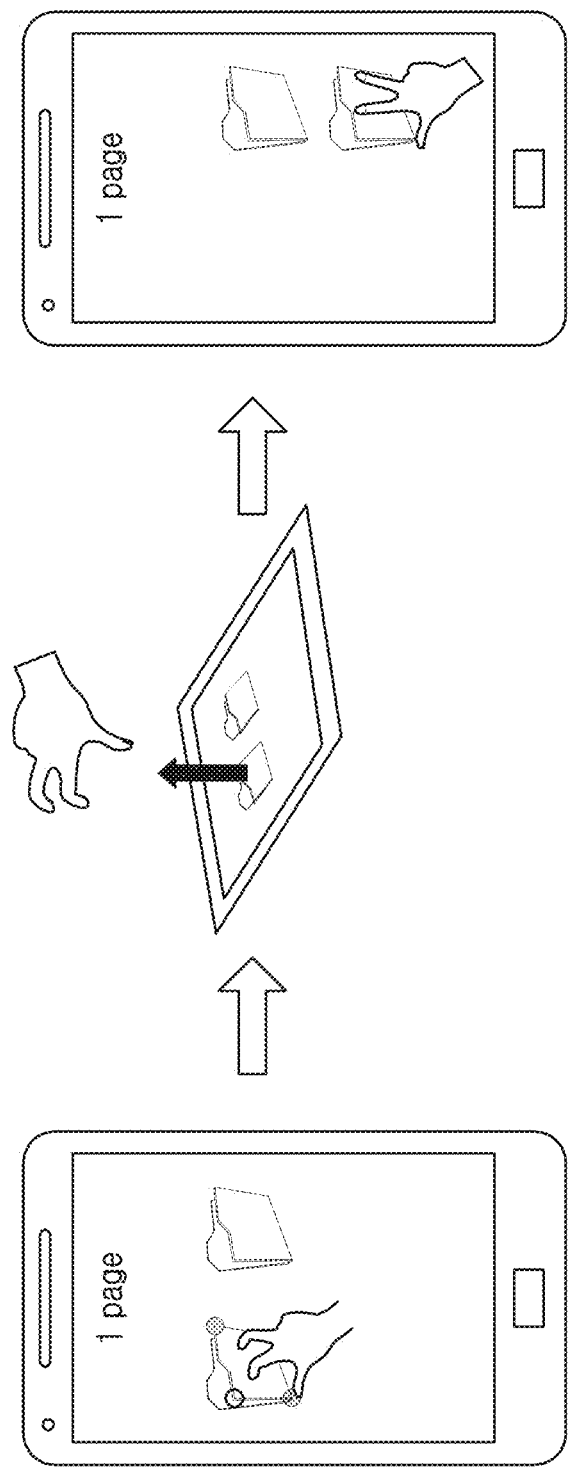

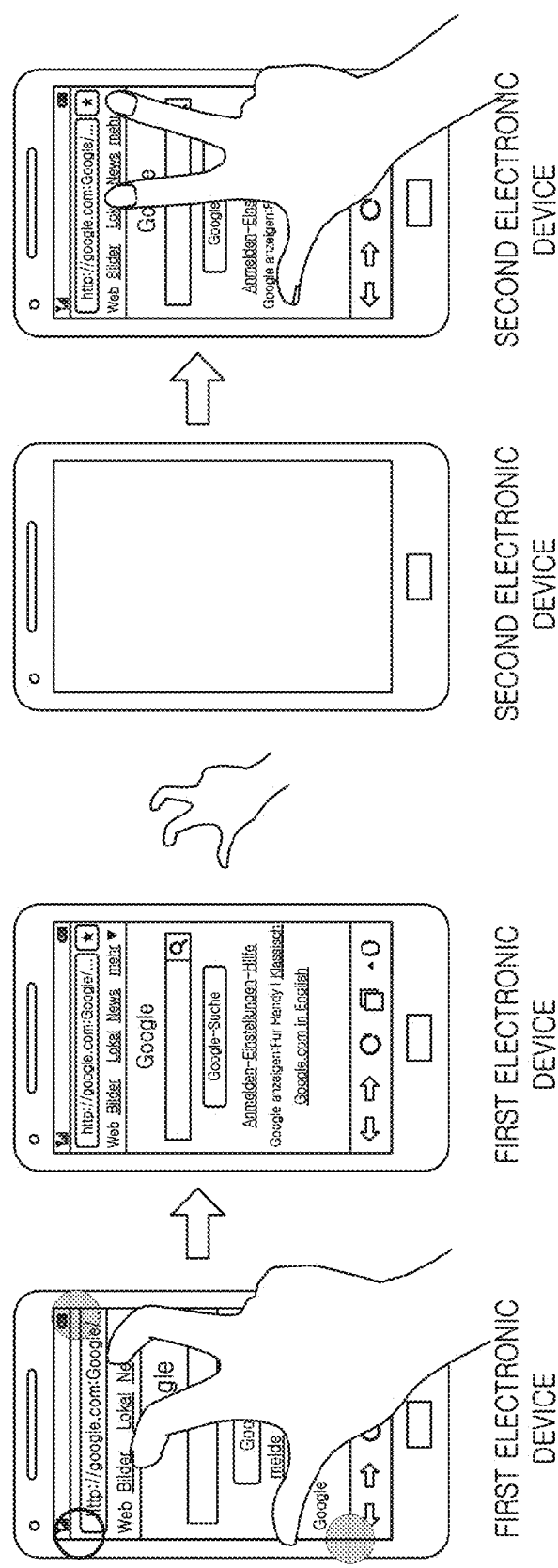

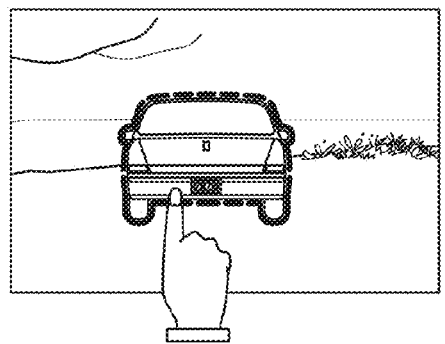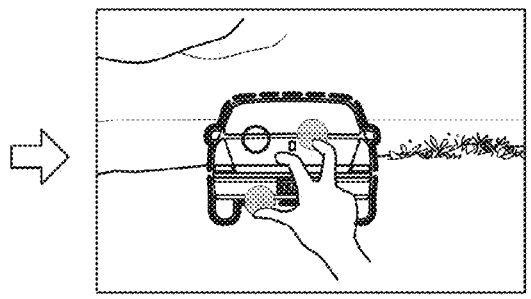
FIG.17A    FIG.17B
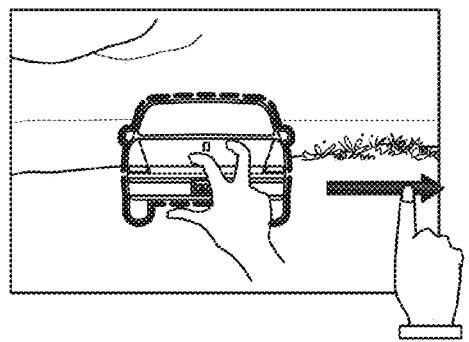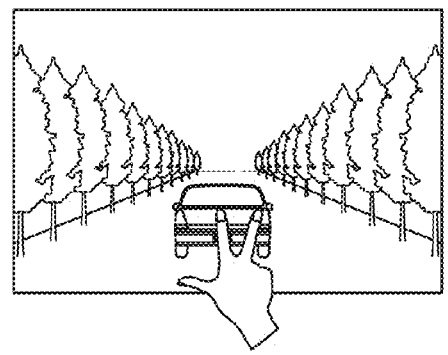
FIG.17C    FIG.17D

METHOD FOR MOVING CONTENTS AND ELECTRONIC DEVICE THEREOF

PRIORITY

This application claims the benefit under 35 U.S.C. §119(a) of a Korean patent application filed on Aug. 13, 2012 in the Korean Intellectual Property Office and assigned Serial No. 10-2012-0088384, the entire disclosure of which is hereby incorporated by reference.

BACKGROUND OF THE INVENTION

1. Field of the Invention:

The present invention relates to content management of an electronic device. More particularly, the present invention relates to a method and apparatus for moving content in the electronic device.

2. Description of the Related Art:

With the rapid development of an electronic device (e.g., a smart phone, a tablet Personal Computer (PC), and the like) capable of wireless voice communication (e.g., telephony) and information exchange, electronic devices have become a necessity of everyday life. The electronic device was recognized as a portable device capable of simple wireless telephony when it was first distributed. However, with the introduction of a related technique and wireless Internet, recent developments have evolved the electronic device into a multimedia device for performing functions such as scheduling, gaming, remotely controlling other devices, image capturing, projecting images, and the like.

In particular, a touch screen supporting simultaneous input and output has been released. Thus, various user interfaces are provided with which a user may provide an input using a touch to the touch screen. For example, when a user intends to move content displayed on the touch screen, a user interface is provided to move the content in such a manner that the content are touched for a specific period of time to activate a content movement function and thereafter the content is dragged to a desired location. However, such a method for moving content may provide an unfamiliar interface to users who are new to using the touch screen or to users who are not familiar with the touch screen.

Therefore, a need exists to provide a more familiar user interface to the users. For example, a need exists to provide a method and apparatus for moving content in an electronic device.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to solve at least the above-mentioned problems and/or disadvantages and to provide at least the advantages described below. Accordingly, an aspect of the present invention is to provide a method and apparatus for moving content in an electronic device.

Another aspect of the present invention is to provide a method and apparatus for determining a content area corresponding to a touch in an electronic device.

Another aspect of the present invention is to provide a method and apparatus for moving content by recognizing a user's gesture of opening a hand after grabbing an object in an electronic device.

In accordance with an aspect of the present invention, a method for moving content of an electronic device is provided. The method includes detecting at least two touches, selecting content corresponding to locations at which the at least two touches are detected, detecting a combined shape of touch entities corresponding the at least two touches if the detected at least two touches are released, and moving the selected content to a location at which the combined shape of the detected at least two touch entities is changed, wherein the touch entities include at least one of a user's finger, a stylus pen, and an extra touch tool.

In accordance with another aspect of the present invention, an apparatus for moving content in an electronic device is provided. The apparatus includes at least one processor, a camera, a memory, and at least one program stored in the memory and configured to be executed by the at least one processor, wherein the at least one program comprises an instruction for detecting at least two touches, for selecting content corresponding to locations at which the at least two touches are detected, and thereafter if the detected at least two touches are released, for detecting a combined shape of touch entities corresponding to the at least two touch entities by using the camera to move the selected content to a location at which the combined shape of the detected touch entities is changed.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 1A-1C illustrate an example of moving content selected by a user in an electronic device according to an exemplary embodiment of the present invention;

FIGS. 11A-11C illustrate an example of moving a folder in an electronic device according to an exemplary embodiment of the present invention;

FIGS. 16A-16C illustrate an example of executing content in an electronic device by moving the content to another electronic device according to an exemplary embodiment of the present invention;

FIGS. 17A-17D illustrate an example of moving an image in such a manner that a user directly determines a desired area of the image in an electronic device according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 2A:
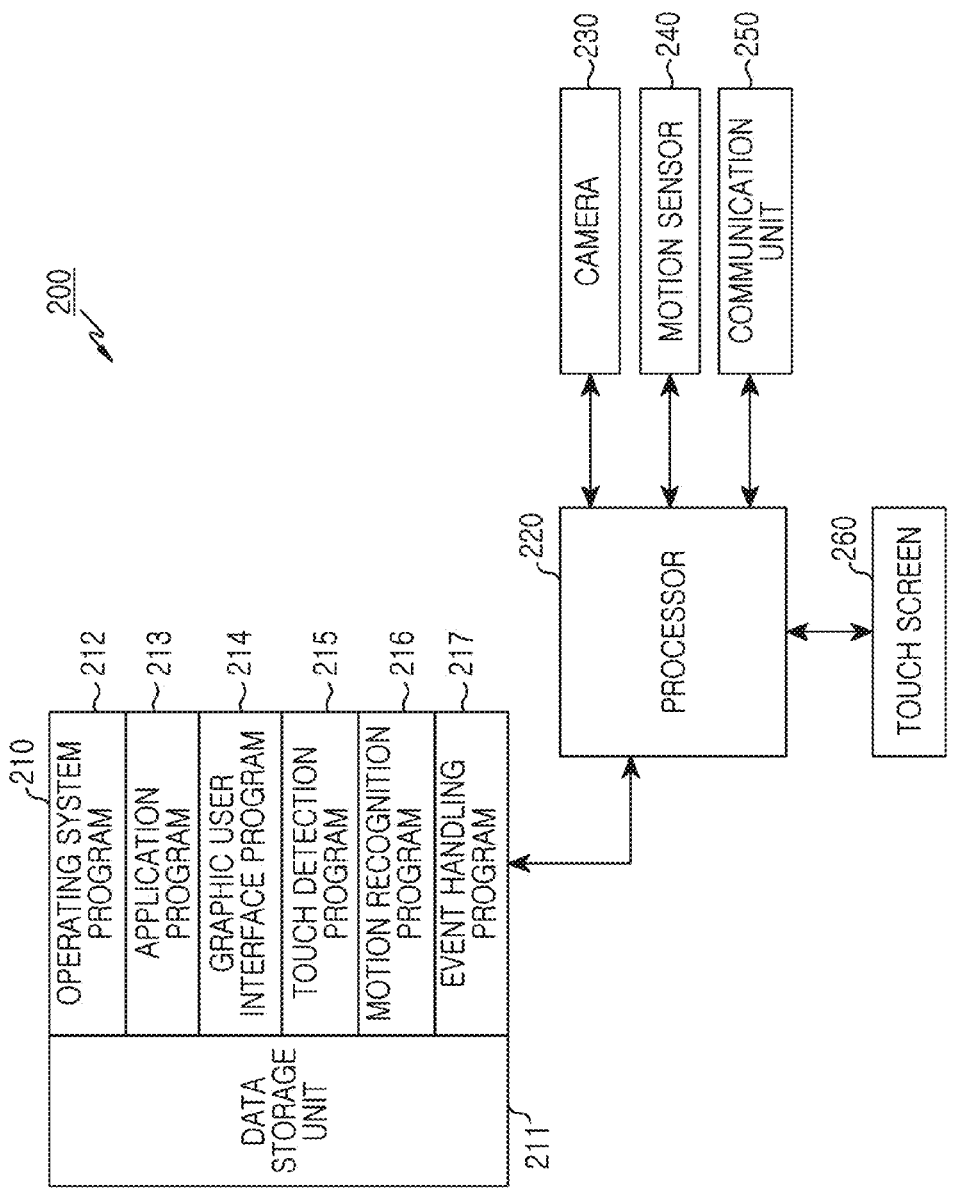
FIG. 2A is a block diagram of an electronic device for moving content be detecting at least two touches according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device described hereinafter corresponds to a device supporting a touch input such as a mobile communication terminal, a smart phone, a tablet Personal Computer (PC), a digital camera, an Motion Picture Experts Group Layer 3 (MP3) player, a navigator, a laptop, a net-book, a computer, a portable gaming device, a Global Positioning System (GPS) device, a television set, a refrigerator, an air conditioner, and the like.

FIGS. 1A-1C illustrate an example of moving content selected by a user in an electronic device according to an exemplary embodiment of the present invention.

Referring to FIG. 1A, the electronic device detects that three points are touched on a screen by the user. Thereafter, if the three touches for the detected three points are dragged toward a center of the three points, the electronic device selects content which exists in an area in which the three touches are detected or content displayed in the area in which the three touches are detected.

Referring to FIG. 1B, the electronic device determines whether the three touches are released. If the three touches are released, the electronic device recognizes a hand shape of the user by using a camera, and moves the selected content according to the hand shape of the user. Specifically, if the three touches (e.g., user contacts) on the screen are released, the electronic device recognizes the hand shape of the user (e.g., a shape of grabbing the selected content, or the like) by driving the camera, detects a movement of the recognized hand shape of the user, and displays the selected content on a real-time basis by moving the content to coordinates of the touch screen corresponding to a location to which the hand shape is moved.

Referring to FIG. 1C, if the electronic device detects, by using the camera, that the hand shape of the user is changed from a grabbing shape to an open-hand shape, the electronic device determines coordinates of the touch screen corresponding to a location of the open-hand shape as a final location of the selected content.

For example, as illustrated in FIGS. 1A-1C, the electronic device according to the exemplary embodiment of the present invention can recognize that the user makes a gesture of grabbing an object, lifting the object, and moving the object to a desired location. Therefore, exemplary embodiments of the present invention can perform an operation as if the content displayed on the screen is lifted and moved to a specific location.

Figure 2B:
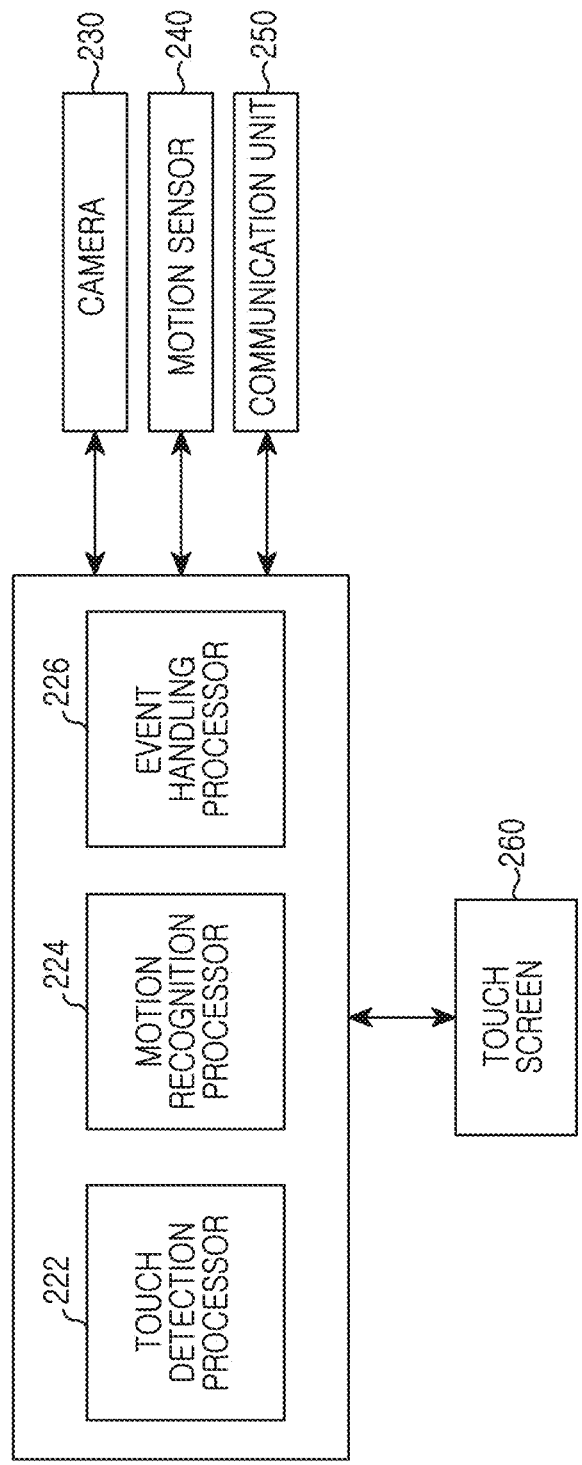
FIG. 2B illustrates a block diagram of an electronic device for moving content according to an exemplary embodiment of the present invention.
Figure 8:
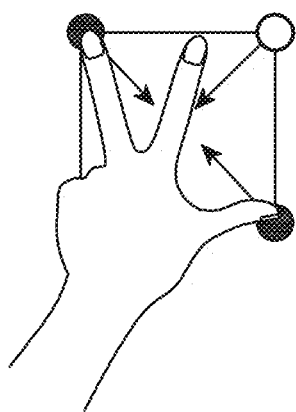
FIG. 8 illustrates a user touch mechanism for selecting content in an electronic device according to an exemplary embodiment of the present invention.
Figure 9:
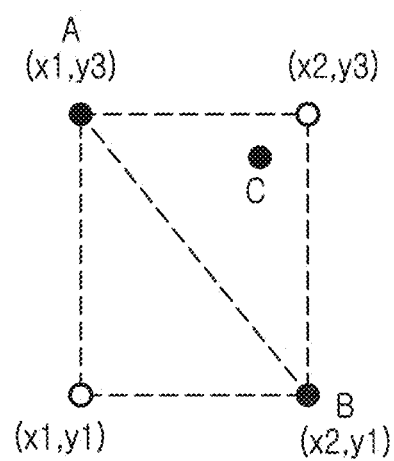
FIG. 9 illustrates an example of determining an area corresponding to at least two touches in an electronic device according to an exemplary embodiment of the present invention.

FIG. 2A is a block diagram of an electronic device for moving content be detecting at least two touches according to an exemplary embodiment of the present invention. FIG. 2B illustrates a block diagram of an electronic device for moving content according to an exemplary embodiment of the present invention. FIG. 8 illustrates a user touch mechanism for selecting content in an electronic device according to an exemplary embodiment of the present invention. FIG. 9 illustrates an example of determining an area corresponding to at least two touches in an electronic device according to an exemplary embodiment of the present invention.

Referring to FIGS. 2A and 2B, an electronic device 200 includes a memory 210, a processor 220, a camera 230, a motion sensor 240, a communication unit 250, and a touch screen 260. According to exemplary embodiments of the present invention, the memory 210 may include a plurality of memories. According to exemplary embodiments of the present invention, the processor 220 may include a plurality of processors.

The memory 210 includes a data storage unit 211, an operating system program 212, an application program 213, a graphic user interface program 214, a touch detection program 215, a motion recognition program 216, an event handling program 217, and the like. In addition, because a program which is a software component can be expressed in a set of instructions, the program is also expressed in an instruction set or module.

The memory 210 may store one or more programs including instructions for executing exemplary embodiments of the present invention.

The data storage unit 211 stores data generated while performing a function corresponding to the program stored in the memory 210. According to exemplary embodiments of the present invention, the data storage unit 211 may store content to be displayed on the touch screen 260. For example, the data storage unit 211 may store image content, text content, sound content, or the like to be displayed on the touch screen 260.

The operating system program 212 (e.g., WINDOWS, LINUX, Darwin, RTXC, UNIX, OS X, VxWorks, or the like) includes various software components for controlling a general system operation. For example, the control of the general system operation includes memory management and control, storage hardware (device) control and management, power control and management, and the like. The operating system program 212 performs a function for facilitating communication between various hardware components (devices) and software components (programs).

The graphic user interface program 214 includes at least one software component for providing a graphic-based user interface between the user and the electronic device 200. For example, the graphic user interface program 214 includes at least one software component for displaying user interface information onto the touch screen 260.

According to exemplary embodiments of the present invention, the graphic user interface program 214 includes an instruction for displaying a plurality of content onto the touch screen 260, and includes an instruction for visually displaying a function executed by a user's gesture. For example, the graphic user interface program 214 may include an instruction for displaying an image graphic onto the touch screen 260, and may include an instruction for visually displaying a screen on which image content is moved by the user's gesture. In addition, the graphic user interface program 214 includes an instruction for displaying a graphic component which shows a clipboard generated by the event handling program 217. Herein, the clipboard may correspond to an application used as a temporary storage space to which the selected content is copied.

The touch detection program 215 may detect a touch for the displayed content, and may detect a release of the touch. In this case, the touch may include a tap, a tap for a specific time period, a double tap, a drag, and the like. In addition, if at least two touches are detected, the touch detection program 215 may detect a drag toward a center of the at least two touches. For example, as illustrated in FIG. 8, the touch detection program 215 may detect touches made by three fingers and thereafter detect a drag toward a center of the detected touches in a state of maintaining the screen touch of the three fingers.

In addition, the touch detection program 215 may detect an additional touch made by the user, in a state in which a combined shape of touch entities is recognized by the motion recognition program 216. The touch entity includes at least one of a user's finger, a stylus pen, an extra touch tool, and the like, and may comprise a combination of these elements. For example, the touch detection program 215 may detect an additional touch for changing a displayed page by the motion recognition program 216, in a state in which a combined shape of user's fingers is a shape of grabbing an object.

The motion recognition program 216 recognizes and analyzes the combined shape of the touch entities by using the camera 230 on a real-time basis. If the combined shape of the touch entities is recognized as a pre-set grabbing shape, the motion recognition program 216 determines whether the combined shape of the touch entities is changed from a grabbing shape to an open-hand shape. Herein, the motion recognition program 216 may determine whether the combined shape of the touch entities is the grabbing shape or the open-hand shape by comparing the combined shape of the touch entities with a combined shape which is pre-set in a design process and by comparing at least two touch points detected by the touch detection program 215 with at least two touch points of which a touch release is detected. More specifically, if the combined shape of the touch entities recognized by using the camera 230 is a shape of grabbing content, the motion recognition program 216 determines whether the combined shape of the touch entities is changed from the grabbing shape to the open-hand shape. In this case, the motion recognition program 216 may detect the combined shape of the touch entities immediately before the combined shape of the touch entities is changed from the grabbing shape to the open-hand shape. For example, the motion recognition program 216 may analyze a recognized combined shape of two fingers to determine whether the analyzed combined shape of two fingers is changed to the open-hand shape, and may determine a center point of the combined shape of two fingers immediately before the analyzed combined shape of two fingers is changed to the open-hand shape.

If the at least two touches are detected by the touch detection program 215, the event handling program 217 may determine a touch area on the basis of the at least two detected touches. If three or more touches are detected by the touch detection program 215, the event handling program 217 may determine the touch area on the basis of the at least two touches among the detected three or more touches. For example, as illustrated in FIG. 9, if touches on points A, B, and C are detected by the touch detection program 215, the event handling program 217 may determine a rectangle comprising vertices of (x1, y3), (x2, y1), (x1, y1), and (x2, y3) as a touch area on the basis of coordinates of the points A and B among the points A, B, and C. The touch area determined by the event handling program 217 corresponds to an area inside a polygon or a looped curve including the coordinates of the touches detected by the touch detection program 215.

In addition, if a drag toward a center of the touches is detected by the touch detection program 215 in a state in which at least two touches are maintained, the event handling program 217 may select content existing inside the touch area, or if the at least two touches are detected by the touch detection program 215, the event handling program 217 may select content existing inside the touch area. The selected content may be various content such as a folder, an icon, a widget, image-type content, sound-type content, text-type content, and the like.

The method of selecting the content includes a method of selecting content existing inside a determined touch area and a method of selecting content displayed inside the determined touch area by clipping the content to the same size as the touch area. The method of selecting the content may be determined in a design process or may be changed by the user.

In addition, if the text-type content is selected, the event handling program 217 may generate a clipboard for temporarily storing the selected text content and then may control the graphic user interface program 214 to display a graphic component which shows the generated clipboard.

Thereafter, if the combined shape of the touch entities is recognized as the pre-set grabbing shape by using the camera 230, the event handling program 217 moves the selected content to coordinates of the touch screen 260 corresponding to a location to which the combined shape of the touch entities is moved. If an additional touch is detected by the touch detection program 215 in a state in which the combined shape of the touch entities is recognized as the pre-set grabbing shape by using the camera 230, the screen may be updated according to the detected additional touch. In this case, the updating of the screen corresponds to updating of the displayed screen to a screen for moving the selected content. For example, if there is an idle screen comprising two pages, when the combined shape of the touch entities is recognized and an additional touch is detected in a state in which an idle screen of a first page is displayed, the event handling program 217 may display the screen by updating the idle screen of the first page to an idle screen of the second page according to the additional touch.

In addition, if the combined shape of the touch entities is recognized as the open-hand shape by using the camera 230, the event handling program 217 may move the selected content to the coordinates of the touch screen 260 corresponding to a location at which the combined shape of the touch entities is changed to the open-hand shape. In other words, the event handling program 217 may determine the coordinates of the touch screen 260 corresponding to a center point of the combined shape of the touch entities detected by the motion recognition program 216 as final coordinates of the selected content. Each coordinate of the touch screen 260 may be mapped, in advance, to a location of an image acquired by using the camera 230. Accordingly, the event handling program 217 may determine the coordinates of the touch screen 260 by analyzing a location of a user's hand shape from the image which is input by using the camera.

In addition, when the electronic device is in a transmission (Tx)/reception (Rx) mode, the event handling program 217 may control the communication unit 250 to transmit the selected content to a different electronic device or to receive specific content from the different electronic device. The Tx/Rx mode corresponds to a mode for transmitting content selected by the event handling program 217 to the different electronic device or to receive content from the different electronic device. The mode of the electronic device 200 may be set according to a user control. For example, a user may control when to operate the electronic device 200 in the Tx/Rx mode.

Although not shown, the processor 220 may comprise at least one processor and a peripheral interface. Further, the processor 220 executes a specific program (e.g., an instruction set) stored in the memory 210 to perform a plurality of specific functions corresponding to the program. For example, the processor 220 may include a touch detector processor 222, a motion recognition processor 224, and an event handling processor 226. The touch detector processor 222, the motion recognition processor 224, and the event handling processor 226 may respectively execute the touch detection program 215, the motion recognition program 216, and the event handling program 217.

The camera 230 includes a camera-related software component which enables camera-related processes and functions. According to exemplary embodiments of the present invention, if the release of two or more touch releases is detected by the touch detection program 215, the camera 230 acquires an image including the combined shape of the touch entities from a time at which the touches are released. In addition, if the reception of specific content is detected by the communication unit 250 in the Tx/Rx mode, the camera 230 may acquire an image including the combined shape of the touch entities located on the touch screen 260. In this case, the touch entities may not be in contact with the touch screen 260 of the electronic device 200 but may be in contact with the touch screen 260 of another electronic device.

The motion sensor 240 includes a motion-related software component which enables motion-related processes and functions. According to exemplary embodiments of the present invention, if the release of two or more touches is detected by the touch detection program 215, the motion sensor 240 may determine whether the touch entities are out of a pre-set neighbor area of the electronic device 200. In addition, if the reception of specific content is detected by the communication unit 250 in the Tx/Rx mode, the motion sensor 240 may detect touch entities which approach from an outer area of the electronic device 200 to the pre-set neighbor area of the electronic device 200. In this case, the touch entities may be not in contact with the touch screen 260 of the electronic device 200 but in contact with the touch screen 260 of another electronic device.

The communication unit 250 may include a Radio Frequency (RF) receiver and transceiver and/or an optical (e.g., infrared ray) receiver and transceiver. For example, the communication unit 250 may include a wireless communication system which supports any one of a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a Wi-Fi network, a WiMax network, a Bluetooth network, and/or the like. The wireless communication system according to exemplary embodiments of the present invention is not limited to a wireless communication system supporting the aforementioned network, and thus may be a wireless communication system supporting another network. If the communication unit 250 is connected to a different electronic device through a specific network, the communication unit 250 may transmit content selected by the event handling program 217 to the different electronic device connected through the specific network or may receive any content from the different electronic device connected through the network.

The touch screen 260 provides an interface for a touch input/output between the electronic device 200 and the user. More specifically, the touch screen 260 is a medium which delivers a user's touch input to the electronic device 200 and which visually provides the output from the electronic device 200 to the user. The touch screen 160 may use various display techniques such as a Liquid Crystal Display (LDC), a Light Emitting Diode (LED), a Light emitting Polymer Display (LPD), an Organic Light Emitting Diode (OLED), an Active Matrix Organic Emitting Diode (AMOLED), a Flexible LED (FLED), and/or the like. The touch screen 260 according to exemplary embodiments of the present invention is not limited to the touch screen which uses the above-identified display techniques.

According to exemplary embodiments of the present invention, the touch screen 260 detects at least two touches, and detects the release of the at least two touches. Upon detection of the release of the at least two touches, the touch screen 260 may detect an additional touch for a screen update. In addition, the touch screen 260 may detect a touch for a mode selection. In this case, a mode includes a Tx/Rx mode and a non-Tx/Rx mode. The non-Tx/Rx mode is a mode in which content of the electronic device 200 are moved inside a screen of the electronic device without transmitting and receiving the content with respect to another electronic device.

Figure 3:
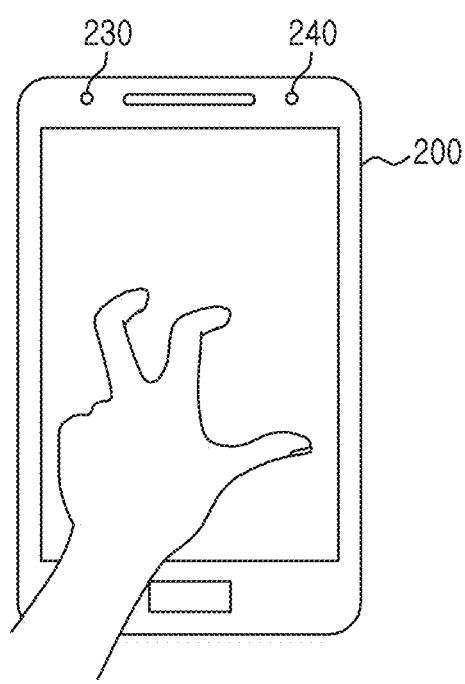
FIG. 3 illustrates an electronic device for moving content by detecting two touches according to an exemplary embodiment of the present invention.

FIG. 3 illustrates an electronic device for moving content by detecting two touches according to an exemplary embodiment of the present invention.

Referring to FIG. 3, the electronic device 200 includes the camera 230 and the motion sensor 240 disposed on the same surface (e.g., a front surface of the electronic device 200). In particular, these elements are provided on the same surface on which a touch screen is provided, so as to detect a user's gesture made on or relative to the touch screen. The camera 230 acquires a combined shape of touch entities as if grabbing selected content. The motion sensor 240 determines whether the touch entities are outside a pre-set neighboring area (e.g., outside a predefined proximity) of the electronic device 200 and whether the touch entities approach to the pre-set neighboring area of the electronic device 200 from an outer area of the electronic device 200. In addition, although not shown, the electronic device 200 may have a proximity sensor to detect a moment at which a touch is released. In this case, the proximity sensor may detect the moment at a faster speed than the camera 230, and the electronic device 200 may recognize the combined shape of the touch entities.

Figure 4A:
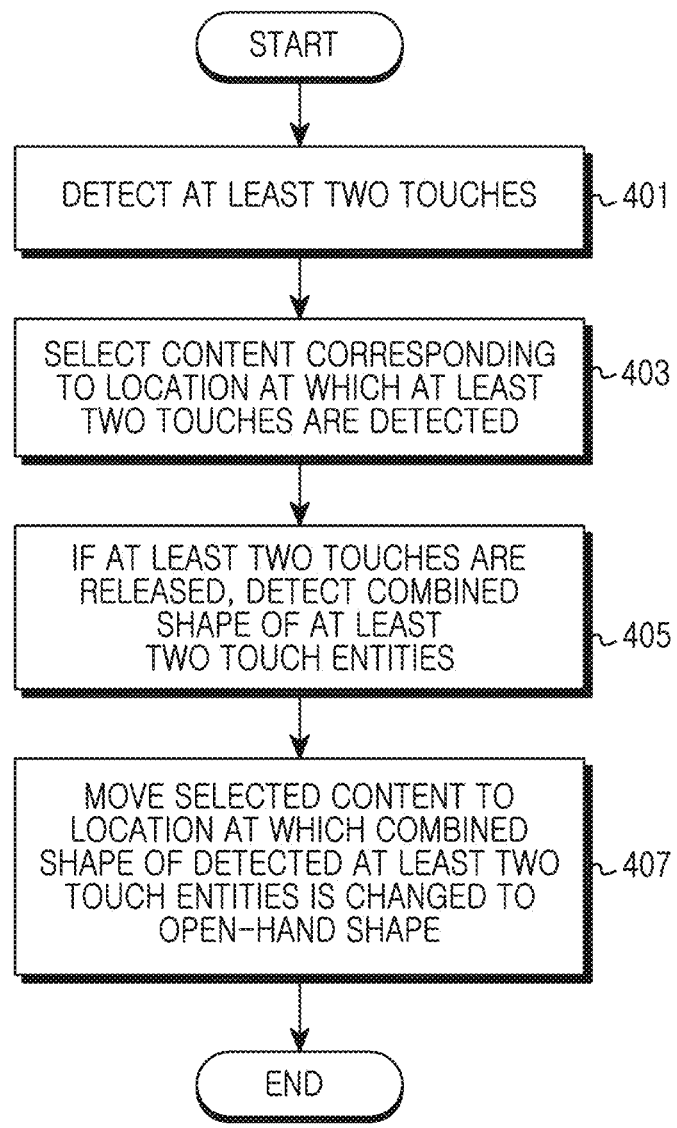
FIG. 4A illustrates a process of moving content by detecting at least two touches in an electronic device according to an exemplary embodiment of the present invention.

FIG. 4A illustrates a process of moving content by detecting at least two touches in an electronic device according to an exemplary embodiment of the present invention.

Referring to FIG. 4A, the electronic device 200 detects at least two touches in step 401. The at least two touches include a touch made by a user's finger, a stylus pen, an extra touch tool, and the like, and may comprise one or at least two combinations thereof.

Thereafter, in step 403, the electronic device 200 selects content corresponding to a location at which the at least two touches are detected. For example, upon detection of the at least two touches, the electronic device 200 may determine a touch area and select content displayed on the touch area. In this case, upon detection of the at least two touches, instead of immediately determining the touch area, if the at least two touches are detected and thereafter the detected touches are dragged toward a center of the touches, the electronic device 200 may determine a touch area and select content displayed in the determined touch area.

In step 405, if the at least two touches are released, the electronic device 200 detects a combined shape of the at least two touch entities.

In step 407, the electronic device 200 moves the selected content to a location at which the detected combined shape of the at least two touches is changed to an open-hand shape. Thereafter, the electronic device 200 ends the procedure of FIG. 4A.

Figure 4B:
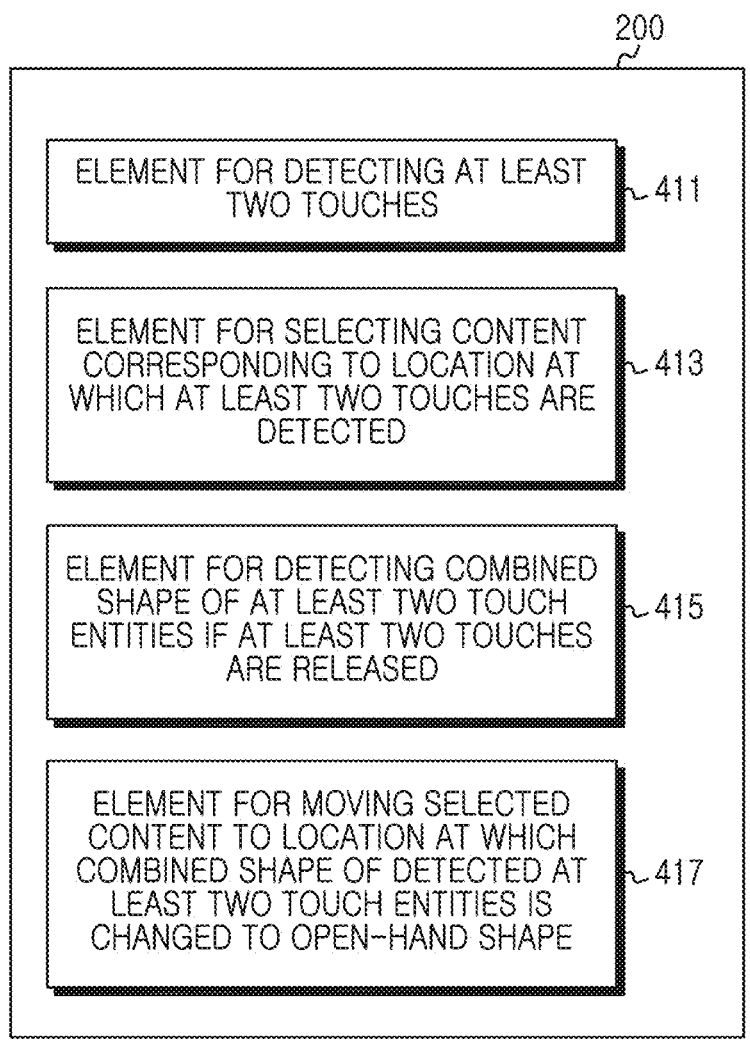
FIG. 4B illustrates an apparatus for performing a process of moving content by detecting at least two touches in an electronic device according to an exemplary embodiment of the present invention.

FIG. 4B illustrates an apparatus for performing a process of moving content by detecting at least two touches in an electronic device according to an exemplary embodiment of the present invention.

Referring to FIG. 4B, the electronic device 200 includes an element 411 for detecting at least two touches and an element 413 for selecting content corresponding to a location at which the at least two touches are detected. In addition, the electronic device 200 includes an element 415 for detecting, if the at least two touches are released, the combined shape of the at least two touch entities. The electronic device 200 also includes an element 417 for moving the selected content to the location at which the detected combined shape of the at least two touch entities is changed to the open-hand shape.

Exemplary embodiments of the present invention described hereinafter relate to a case in which the electronic device 200 does not immediately determine a touch area upon detection of at least two touches but determines a touch area if the at least two touches are detected and thereafter the detected touches are dragged toward a center of the touches. However, exemplary embodiments of the present invention described hereinafter are equally applicable to a method of immediately determining the touch area upon detection of the at least two touches.

Figure 5:
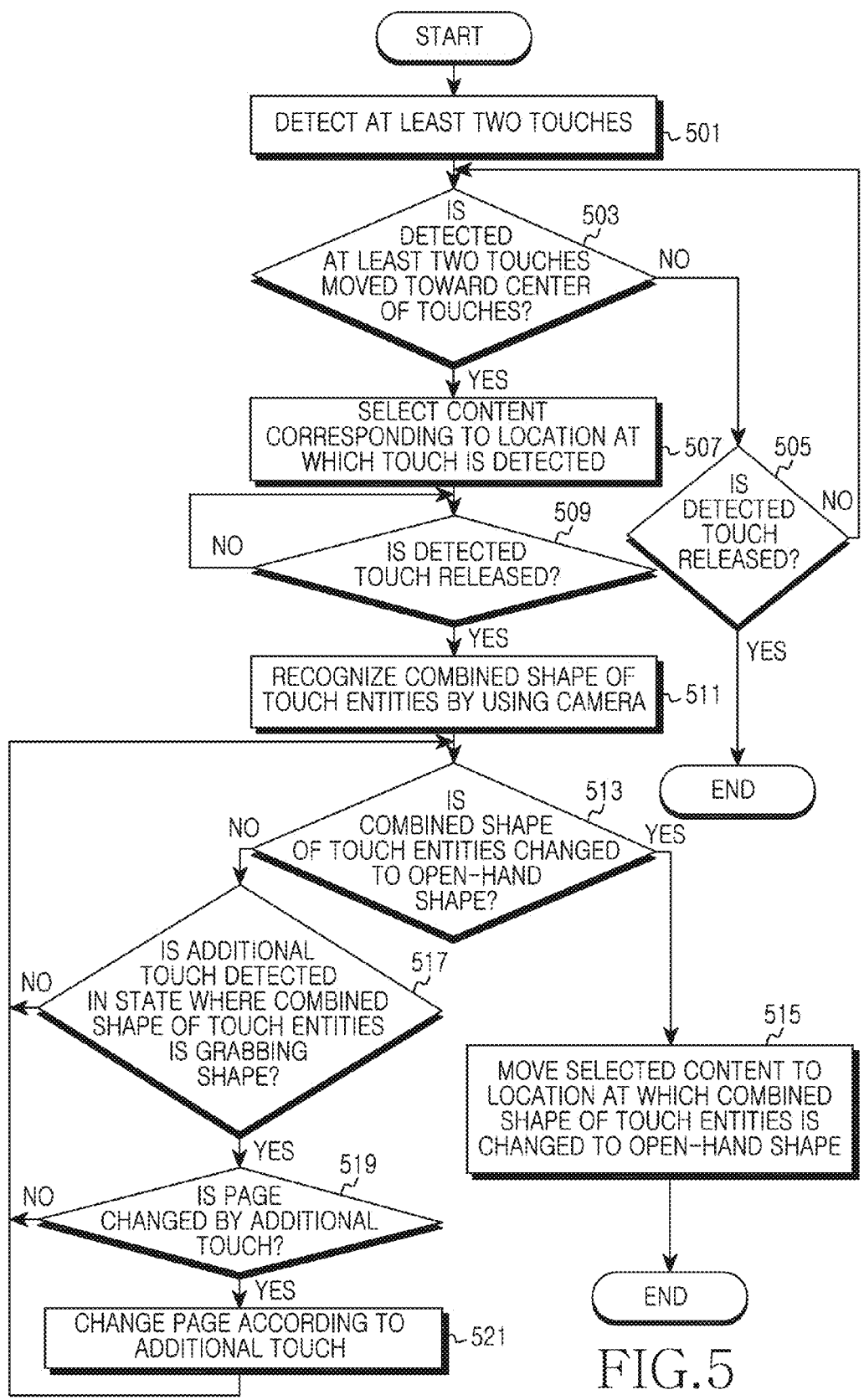
FIG. 5 illustrates a process of moving content in an electronic device according to an exemplary embodiment of the present invention.
Figure 10C:
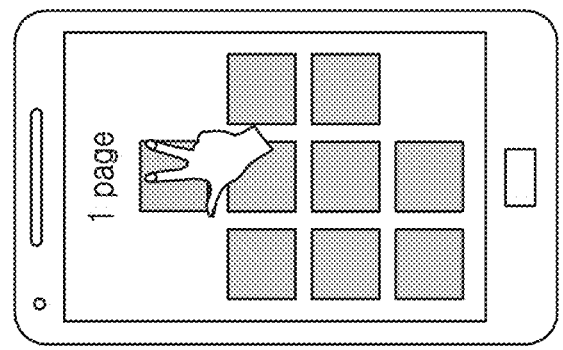
FIGS. 10A-10C illustrate an example of moving an icon in an electronic device according to an exemplary embodiment of the present invention.
Figure 10B:
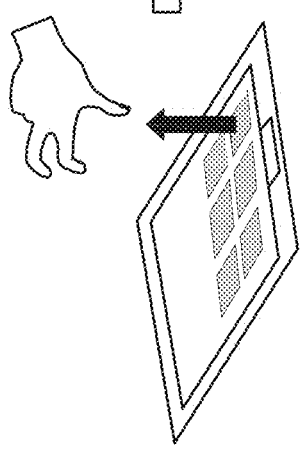
Figure 10A:
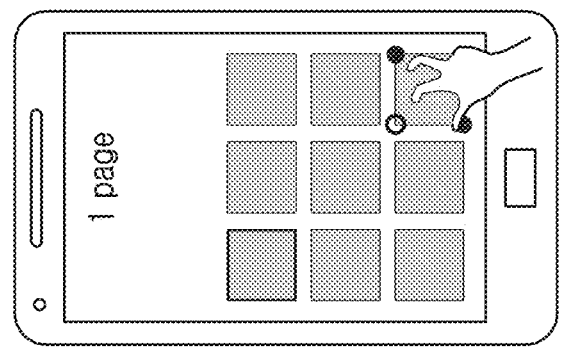
Figure 12C:
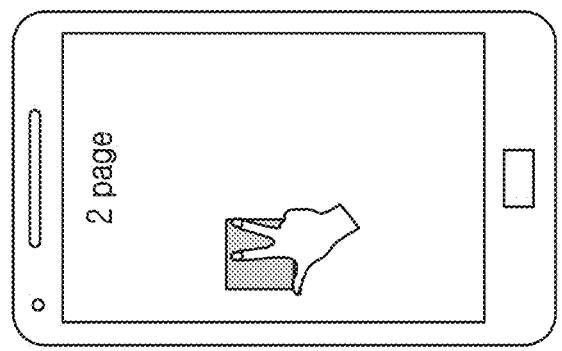
FIGS. 12A-12C illustrate an example of moving an icon to another page in an electronic device according to an exemplary embodiment of the present invention.
Figure 12B:
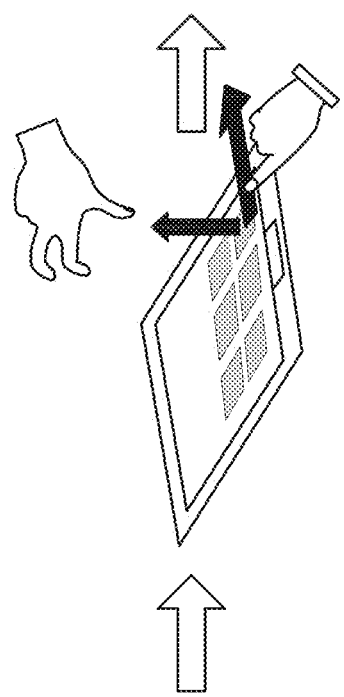
Figure 12A:
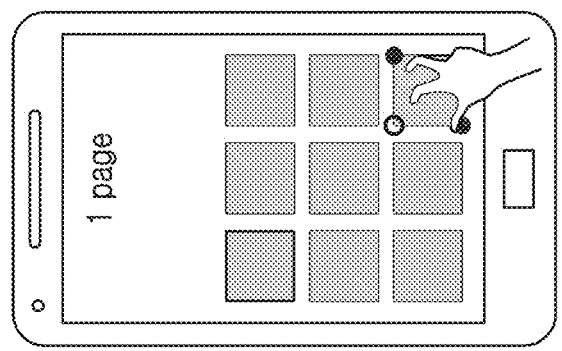
Figure 13C:
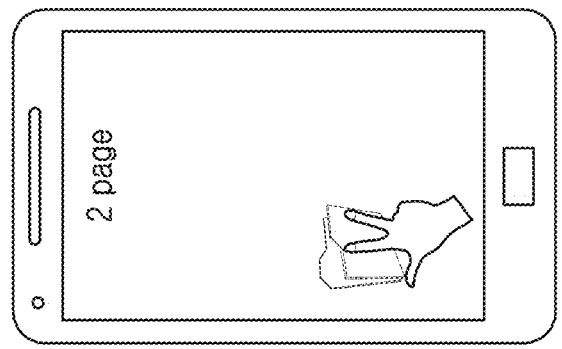
FIGS. 13A-13C illustrate an example of moving a folder to another page in an electronic device according to an exemplary embodiment of the present invention.
Figure 13B:
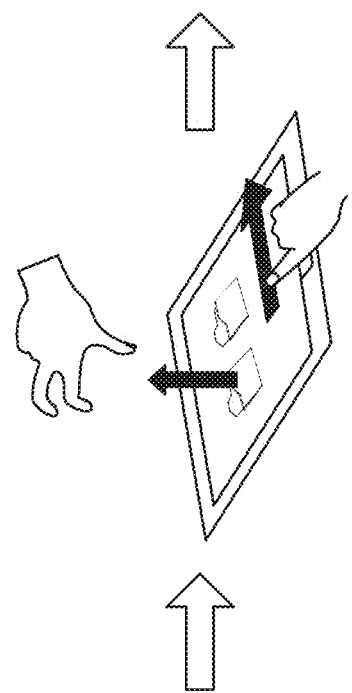
Figure 13A:
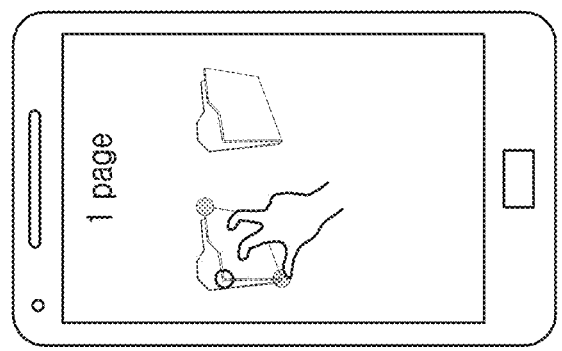

FIG. 5 illustrates a process of moving content in an electronic device according to an exemplary embodiment of the present invention. FIGS. 10A-10C illustrate an example of moving an icon in an electronic device according to an exemplary embodiment of the present invention. FIGS. 11A-11C illustrate an example of moving a folder in an electronic device according to an exemplary embodiment of the present invention. FIGS. 12A-12C illustrate an example of moving an icon to another page in an electronic device according to an exemplary embodiment of the present invention. FIGS. 13A-13C illustrate an example of moving a folder to another page in an electronic device according to an exemplary embodiment of the present invention.

Referring to FIG. 5, the electronic device 200 detects at least two touches in step 501. Thereafter, the electronic device 200 determines whether the detected at least two touches are moved toward a center of the touches in step 503. For example, as illustrated in FIG. 8, the electronic device 200 detects a touch made by three fingers and thereafter determines whether the three fingers are dragged toward a center of the detected touches.

If the electronic device 200 determines that the at least two touches are not moved toward the center of the touches in step 503, the electronic device 200 proceeds to step 505 in which the electronic device 200 determines whether the detected touch is released. If the electronic device 200 determines that the detected touch is released in step 505, the electronic device 200 ends the procedure of FIG. 5. Otherwise, if the electronic device 200 determines that the detected touch is not released in step 505, the electronic device 200 returns to step 503.

If the electronic device 200 determines that the at least two touches are moved toward the center of the touches in step 503, the electronic device 200 proceeds to step 507 in which the electronic device 200 selects content corresponding to a location at which the touch is detected. In this case, if the at least two touches are detected, the electronic device 200 may determine a touch area on the basis of coordinates of the at least two touches and select content displayed in the touch area. For example, as illustrated in FIG. 9, if touches on points A, B, and C are detected, the electronic device 200 may determine a rectangle comprising vertices of (x1, y3), (x2, y1), (x1, y1), and (x2, y3) as a touch area on the basis of coordinates (x1 , y3) and (x2, y1) of the points A and B.

Thereafter, in step 509, the electronic device 200 determines whether the detected touch is released. If the electronic device 200 determines that the detected touch is not released in step 509, the electronic device 200 repeats step 509.

Otherwise, if the electronic device 200 determines that the detected touch is released in step 509, the electronic device 200 proceeds to step 511 in which the electronic device 200 recognizes a combined shape of touch entities located on the touch screen 260 and not in contact with the touch screen 260 by using the camera 230. In this case, the combined shape of the touch entities recognized by using the camera 230 of the electronic device 200 may be a pre-set grabbing shape.

Thereafter, in step 513, the electronic device 200 determines whether the combined shape of the touch entities is changed to an open-hand shape. In other words, the electronic device 200 analyzes the combined shape of the touch entities by using the camera 230 and determines whether the combined shape of the touch entities is changed from the grabbing shape to the open-hand shape. In this case, the electronic device 200 may change a location at which the content is displayed on a real-time basis according to a location to which the combined grabbing shape is moved.

If the electronic device 200 determines that the combined shape of the touch entities corresponds to the open-hand shape in step 513, the electronic device 200 proceeds to step 515 in which the electronic device 200 moves the selected content to a location at which the combined shape of the touch entities is changed to the open-hand shape, and then ends the procedure of FIG. 5.

For example, as illustrated in FIG. 10A, when a user makes a gesture as if grabbing a specific icon, the electronic device 200 detects three touches on the specific icon and a drag thereof, and selects the specific icon displayed in a touch area. Thereafter, as illustrated in FIG. 10B, when the user makes a gesture as if lifting the grabbed icon, the electronic device 200 recognizes that the recognized combined shape of user's fingers is the grabbing shape by using the camera 230, and displays the icon by moving the icon on a real-time basis according to a location to which the user's finger shape is moved while the grabbing shape is maintained. Thereafter, as illustrated in FIG. 10C, when the user makes a gesture as if releasing the icon by opening the grabbing hand, the electronic device 200 detects that the combined shape of the user's fingers is changed to the open-hand shape, moves the selected icon to a location at which the combined shape is changed to the open-hand shape, and then ends the operation of moving the icon.

As another example, as illustrated in FIG. 11A, when the user makes a gesture as if grabbing a specific folder, the electronic device 200 detects three touches on a specific folder, and selects the specific folder displayed in a touch area. Thereafter, as illustrated in FIG. 11B, when the user makes a gesture as if lifting the grabbed folder, the electronic device 200 recognizes that the recognized combined shape of user's fingers is the grabbing shape by using the camera 230, and displays the folder by moving the folder on a real-time basis according to a location to which the user's finger shape is moved while the grabbing shape is maintained. Thereafter, as illustrated in FIG. 11C, when the user makes a gesture as if releasing the folder by opening the grabbing hand, the electronic device 200 detects that the combined shape of the user's fingers is changed to the open-hand shape, moves the selected folder to a location at which the combined shape is changed to the open-hand shape, and then ends the operation of moving the folder.

In contrast, if the electronic device 200 determines that the combined shape of the touch entities is not the open-hand shape in step 513, the electronic device 200 proceeds to step 517 in which the electronic device 200 determines whether an additional touch is detected in a state in which the combined shape of the touch entities is the grabbing shape. If the electronic device 200 determines that the additional touch is not detected in the state in which the combined shape of the touch entities is the grabbing shape in step 517, the electronic device 200 returns to step 513.

In contrast, if the electronic device 200 determines that the additional touch is detected in the state in which the combined shape of the touch entities is the grabbing shape in step 517, the electronic device 200 proceeds to step 519 in which the electronic device 200 determines whether a page is changed by the additional touch.

If the electronic device 200 determines that the page is not changed by the additional touch in step 519, the electronic device 200 returns to step 513.

Otherwise, if the electronic device 200 determines that the page is changed by the additional touch in step 519, the electronic device 200 proceeds to step 521 in which the electronic device displays the page by changing the page according to the additional touch, and thereafter returning to step 513.

For example, as illustrated in FIG. 12A, the user makes a gesture as if grabbing a specific icon and thus the electronic device 200 selects the specific icon. In this state, as illustrated in FIG. 12B, if the user makes a gesture as if lifting the grabbed icon and then drags a screen by using another finger, the electronic device 200 detects occurrence of an additional touch and a drag on the screen while the combined shape of the user's fingers is recognized as the grabbing shape by using the camera 230, and displays the page by changing a currently display page (e.g., page 1) to a next page (e.g., a page 2). Thereafter, as illustrated in FIG. 12C, when the user makes a gesture as if releasing an icon by opening the grabbing hand, the electronic device 200 detects that the combined shape of the user's fingers is changed to the open-hand shape, moves the selected icon to a location at which the combined shape is changed to the open-hand shape in the page 2, and then ends the operation of moving the icon.

As another example, as illustrated in FIG. 13A, the user makes a gesture as if grabbing a specific folder and thus the electronic device 200 selects the specific folder. In this state, as illustrated in FIG. 13B, if the user makes a gesture as if lifting the grabbed folder and then drags a screen by using another finger, the electronic device 200 detects occurrence of an additional touch and a drag on the screen while the combined shape of the user's fingers is recognized as the grabbing shape by using the camera 230, and displays the page by changing a currently display page (e.g., page 1) to a next page (e.g., a page 2). Thereafter, as illustrated in FIG. 13C, when the user makes a gesture as if releasing a folder by opening the grabbing hand, the electronic device 200 detects that the combined shape of the user's fingers is changed to the open-hand shape, moves the selected folder to a location at which the combined shape is changed to the open-hand shape in the page 2, and then ends the operation of moving the folder.

Figure 6A:
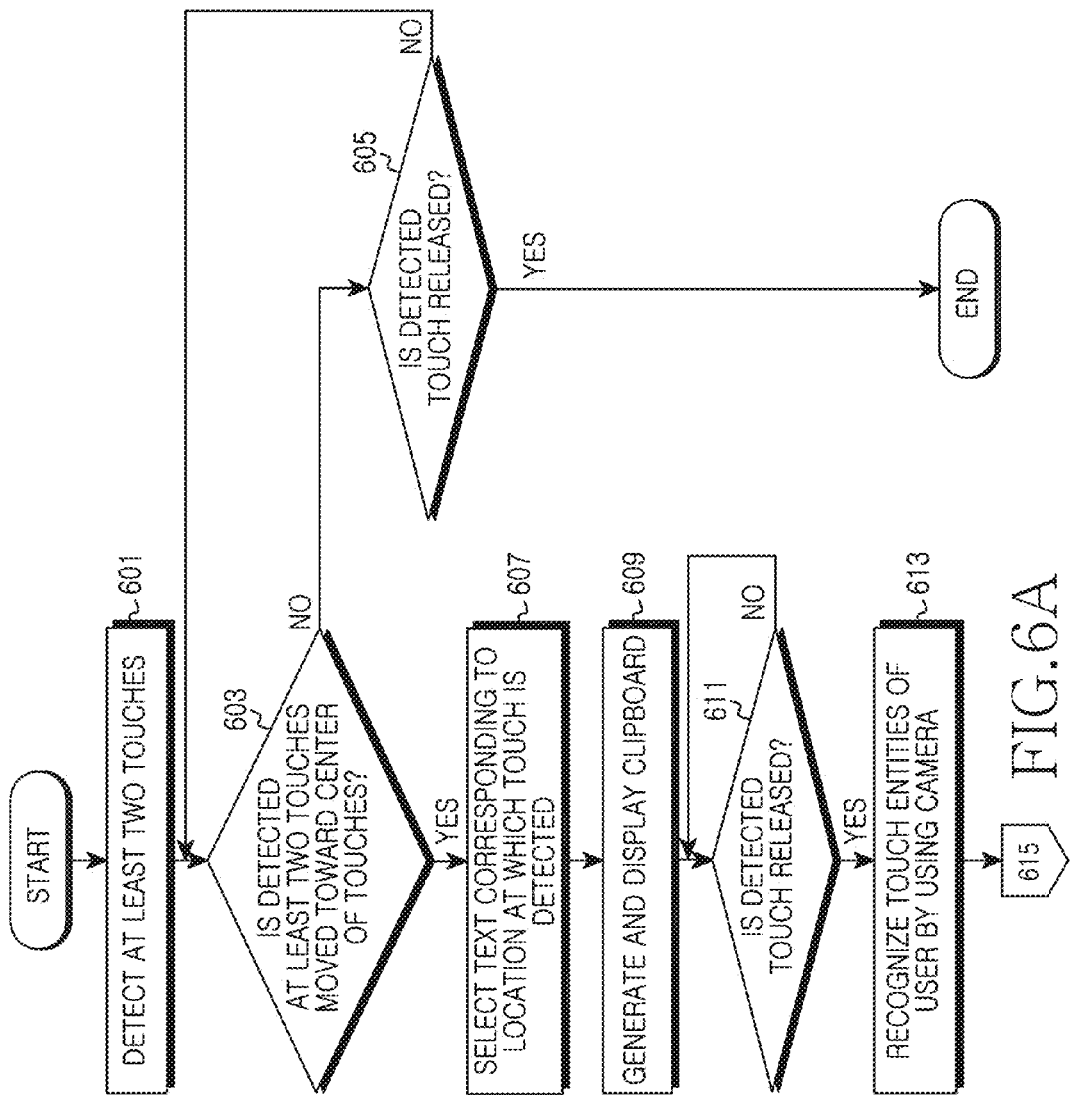
FIGS. 6A and 6B illustrate a process of moving text content to a clipboard by detecting at least two touches in an electronic device according to an exemplary embodiment of the present invention.
Figure 6B:
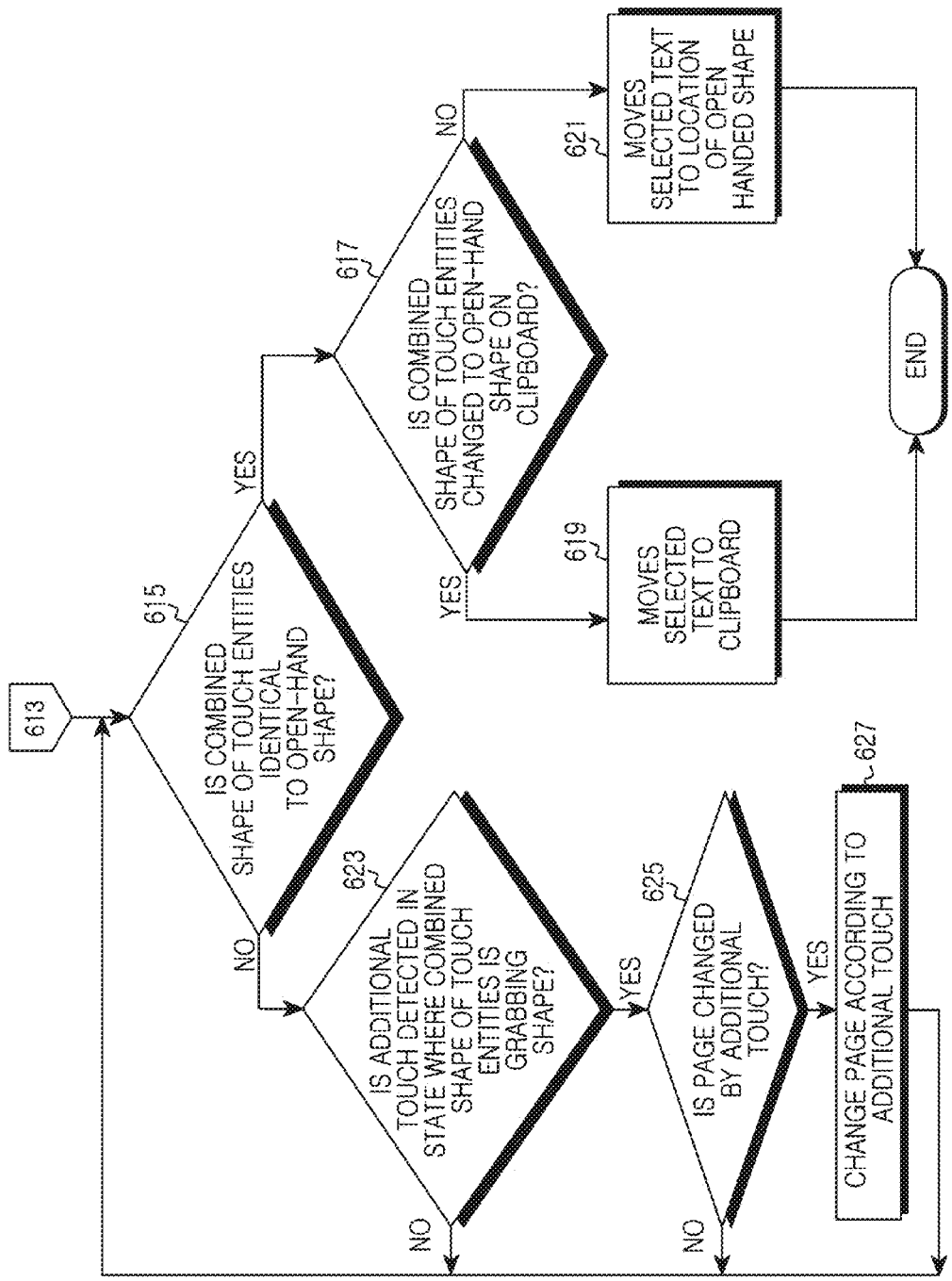
Figures 14A, 14B:
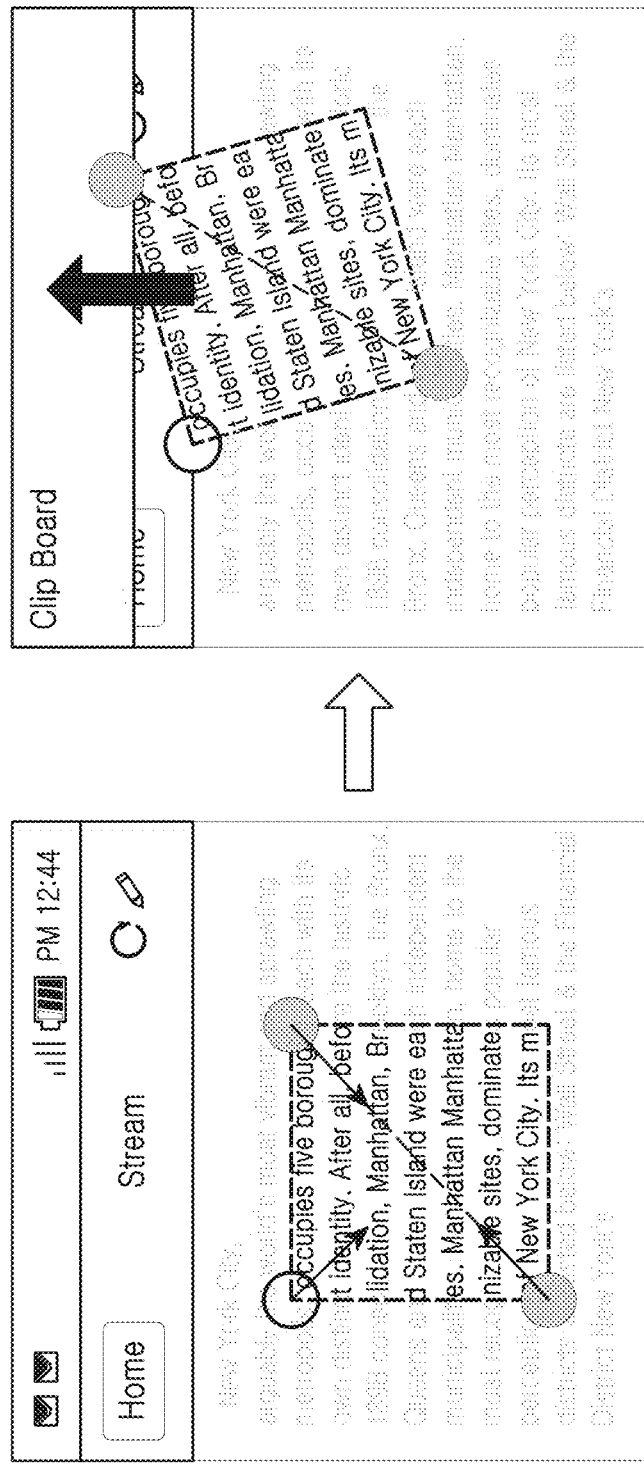
FIGS. 14A and 14B illustrate an example of moving text content to a clipboard in an electronic device according to an exemplary embodiment of the present invention.

FIGS. 6A and 6B illustrate a process of moving text content to a clipboard by detecting at least two touches in an electronic device according to an exemplary embodiment of the present invention. FIGS. 14A and 14B illustrate an example of moving text content to a clipboard in an electronic device according to an exemplary embodiment of the present invention.

Referring to FIGS. 6A and 6B, it is assumed in FIG. 6 that the electronic device 200 selects the text content.

In step 601, the electronic device 200 detects at least two touches. Thereafter, in step 603, the electronic device 200 determines whether the detected at least two touches are moved toward a center of the touches in step 603.

If the electronic device 200 determines that the at least two touches are not moved toward the center of the touches in step 603, the electronic device 200 proceeds to step 605 in which the electronic device 200 determines whether the detected touch is released. If the electronic device 200 determines that the detected touch is released in step 605, the electronic device 200 ends the procedure of FIG. 6. Otherwise, if the electronic device 200 determines that the detected touch is not released in step 605, the electronic device 200 returns to step 603.

In contrast, if the electronic device 200 determines that the at least two touches are moved toward the center of the touches in step 603, the electronic device 200 proceeds to step 607 in which the electronic device 200 selects a text corresponding to a location at which the touch is detected. If the at least two touches are detected, the electronic device 200 may determine a touch area on the basis of coordinates of the at least two touches and select a text displayed in the touch area.

Thereafter, in step 609, the electronic device 200 generates and displays a clipboard. Herein, the clipboard corresponds to a temporary storage space for copying the selected text.

In step 611, the electronic device 200 determines whether the detected touch is released. If the electronic device 200 determines that the detected touch is not released in step 611, the electronic device 200 repeats step 611.

Otherwise, if the electronic device 200 determines that the detected touch is released in step 611, the electronic device 200 proceeds to step 613 in which the electronic device 200 recognizes a combined shape of touch entities located on the touch screen 260 and not in contact with the touch screen 260 by using the camera 230. In this case, the combined shape of the touch entities recognized by using the camera 230 of the electronic device 200 may be a pre-set grabbing shape.

In step 615, the electronic device 200 determines whether the combined shape of the touch entities is changed to an open-hand shape. For example, the electronic device 200 analyzes the combined shape of the touch entities by using the camera 230 and determines whether the combined shape of the touch entities is changed from the grabbing shape to the open-hand shape. In this case, the electronic device 200 displays a text by moving the text on a real-time basis according to a location to which the combined grabbing shape is moved.

If the electronic device 200 determines that the combined shape of the touch entities is changed to the open-hand shape in step 615, the electronic device 200 proceeds to step 617 in which the electronic device 200 determines whether the combined shape of the touch entities is changed to the open-hand shape on a clipboard. If the electronic device 200 determines that the combined shape of the touch entities is changed to the open-hand shape on the clipboard in step 617, the electronic device 200 proceeds to step 619 in which the electronic device 200 moves the selected text to the clipboard and then ends the procedure of FIG. 6.

For example, as illustrated in FIG. 14A, when a user makes a gesture as if grabbing a specific text, the electronic device 200 detects three touches on the specific text and a drag thereof, and selects the text displayed in a touch area. Thereafter, as illustrated in FIG. 14B, when the user makes a gesture as if lifting the grabbed text, the electronic device 200 generates and displays a clipboard. Thereafter, when the user makes a gesture as if releasing the test by opening the grabbing hand, the electronic device 200 may detect that the combined shape of the user's fingers is changed to the open-hand shape, and then may copy or move the selected text to the clipboard as illustrated in FIG. 14B.

If the electronic device 200 determines that the combined shape of the touch entities is changed to the open-hand shape at a location other than the clipboard in step 617, the electronic device 200 proceeds to step 621 in which the electronic device 200 moves the selected text to a location at which the combined shape is changed to the open-hand shape, and then ends the procedure of FIG. 6.

In contrast, if the electronic device 200 determines that the combined shape of the touch entities is not the open-hand shape in step 615, the electronic device 200 proceeds to step 623 in which the electronic device 200 determines whether an additional touch is detected in a state in which the combined shape of the touch entities is the grabbing shape. The additional touch may be a drag for changing a currently displayed page to another page.

If the electronic device 200 determines that the additional touch is not detected in the state in which the combined shape of the touch entities is the grabbing shape in step 623, the electronic device 200 returns to step 615.

Otherwise, if the electronic device 200 determines that the additional touch is detected in the state in which the combined shape of the touch entities is the grabbing shape in step 623, the electronic device 200 proceeds to step 625 in which the electronic device 200 determines whether a page is changed by the additional touch.

If the electronic device 200 determines that the page is not changed by the additional touch in step 625, the electronic device 200 returns to step 615. Otherwise, if the electronic device 200 determines that the page is changed by the additional touch in step 625, the electronic device 200 proceeds to step 627 in which the electronic device changes the page according to the additional touch, and thereafter the electronic device 200 returns to step 615.

Figure 7A:
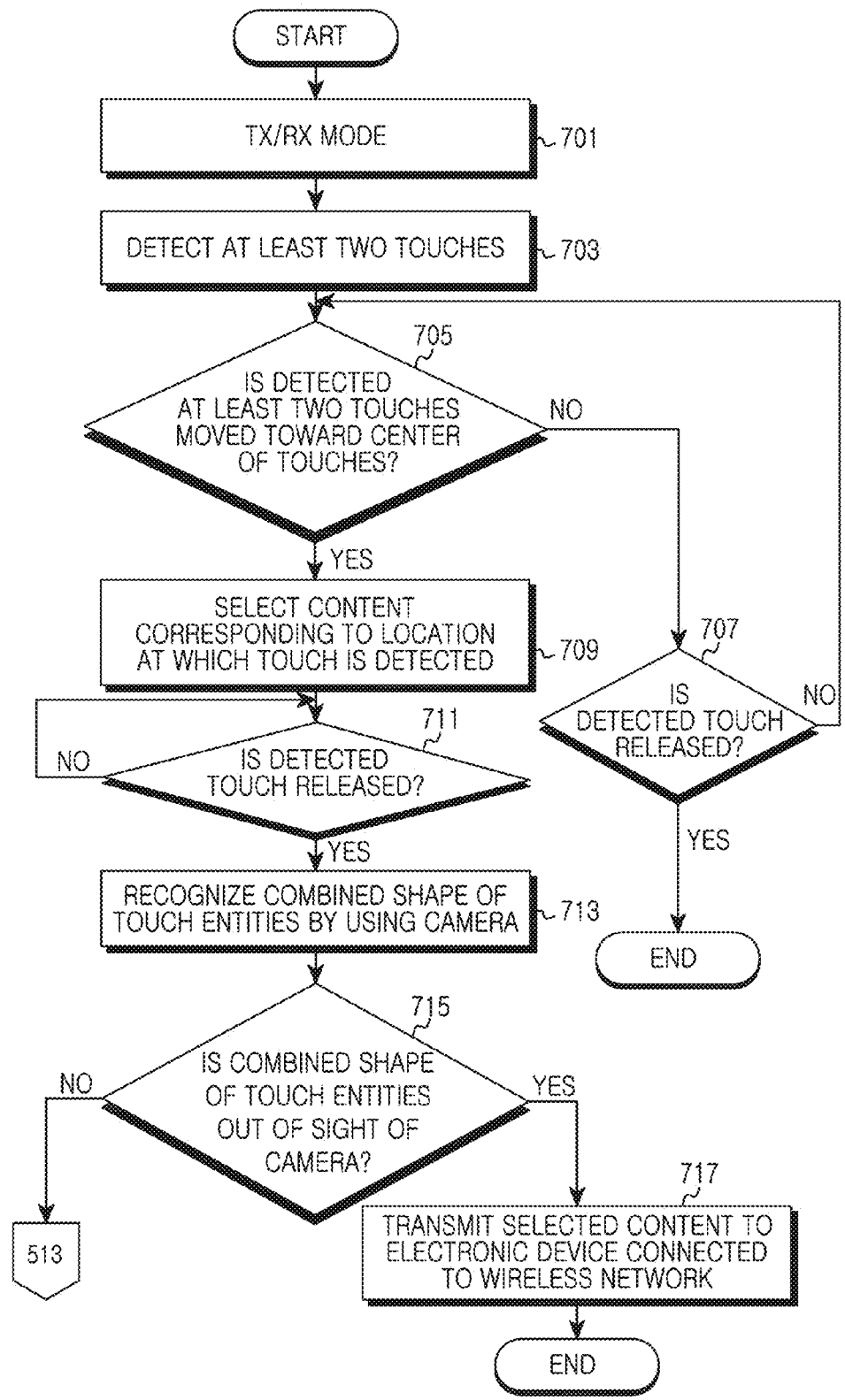
FIG. 7A illustrates a process of transmitting selected content to another electronic device when an electronic device is in a Transmission (Tx)/Reception (Rx) mode according to an exemplary embodiment of the present invention.
Figures 15A, 15B, 15C:
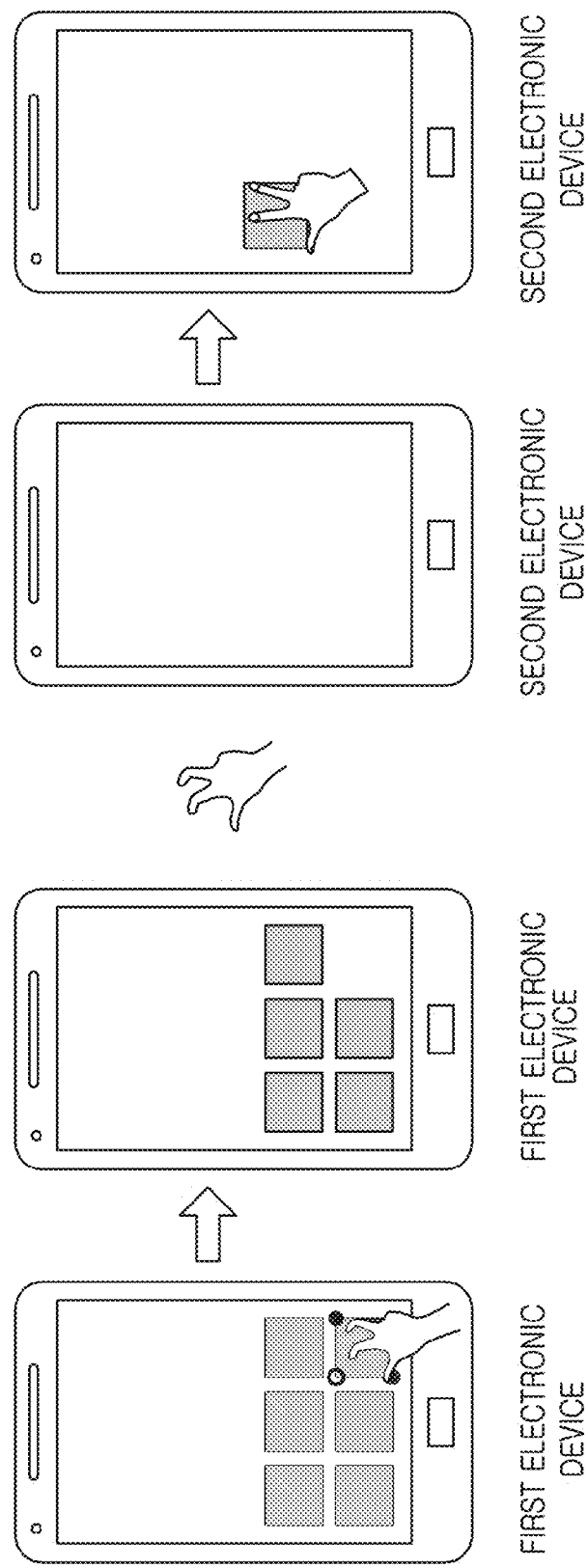
FIGS. 15A-15C illustrate an example of moving an icon from an electronic device to another electronic device according to an exemplary embodiment of the present invention.

FIG. 7A illustrates a process of transmitting selected content to another electronic device when the electronic device is in a Tx/Rx mode according to an exemplary embodiment of the present invention. FIGS. 15A-15C illustrate an example of moving an icon from an electronic device to another electronic device according to an exemplary embodiment of the present invention.

Referring to FIG. 7A, the electronic device 200 receives a data input for entering the Tx/Rx mode in step 701. The Tx/Rx mode corresponds to a mode for transmitting content selected by the electronic device 200 to a different electronic device or for receiving content from the different electronic device. An electronic device in the Tx/Rx mode may be connected, in advance, to the different electronic device in a wired or wireless fashion.

Thereafter, in step 703, the electronic device 200 detects at least two touches.

In step 705, the electronic device 200 determines whether the detected at least two touches are moved toward a center of the touches.

If the electronic device 200 determines that the at least two touches are not moved toward the center of the touches in step 705, the electronic device 200 proceeds to step 707 in which the electronic device 200 determines whether the detected touch is released. If the electronic device 200 determines that the detected touch is released in step 707, the electronic device 200 ends the procedure of FIG. 7. Otherwise, if the electronic device 200 determines that the detected touch is not released, the electronic device 200 returns to step 705.

In contrast, if the electronic device 200 determines that the at least two touches are moved toward the center of the touches in step 705, the electronic device 200 proceeds to step 709 in which the electronic device 200 selects content corresponding to a location at which the touch is detected. If the at least two touches are detected, the electronic device 200 may determine a touch area on the basis of coordinates of the at least two touches and select content displayed in the touch area.

In step 711, the electronic device 200 determines whether the detected touch is released. If the electronic device 200 determines that the detected touch is not released in step 711, the electronic device 200 returns to step 711.

Otherwise, if the electronic device 200 determines that the detected touch is released in step 711, the electronic device 200 proceeds to step 713 in which the electronic device 200 recognizes a combined shape of touch entities located on the touch screen 260 and not in contact with the touch screen 260 by using the camera 230. In this case, the combined shape of the touch entities recognized by using the camera 230 of the electronic device 200 may be a pre-set grabbing shape.

In step 715, the electronic device 200 determines whether the combined shape of the touch entities is out of sight of the camera. In this case, whether the combined shape of the touch entities is out of sight of the camera may be determined by analyzing an image acquired by the camera 230. In addition, the electronic device may use the motion sensor 240 to determine whether the touch entities are out of a pre-set neighbor area of the electronic device 200, and thus may determine whether the combined shape of the touch entities is out of sight of the camera 230.

If the electronic device 200 determines that the combined shape of the touch entities is not out of sight of the camera in step 715, the electronic device 200 returns to step 513 of FIG. 5.

Otherwise, if the electronic device 200 determines that the combined shape of the touch entities is out of sight of the camera in step 715, the electronic device 200 proceeds to step 717 in which the electronic device 200 transmits selected content to the different electronic device. The different electronic device may be an electronic device connected in advance in a wireless or wired fashion, or may be an electronic device which is not connected in advance and to which information (e.g., a phone number) is input by a user.

For example, as illustrated in FIG. 15A, when the user makes a gesture as if grabbing specific content, a first electronic device selects the specific content corresponding to three touches detected in the Tx/Rx mode. Thereafter, as illustrated in FIG. 15B, when the user makes a gesture as if lifting the grabbed content and then moves to an area out of an upper portion of a screen of the first electronic device, the first electronic device detects that the combined shape is out of sight of the camera in a state in which the combined shape of user's fingers is the grabbing shape, and transmits the selected content to a second electronic device.

In step 717, if content to be transmitted are any one of a URL, an address book, a business card, an MP3, the electronic device may transmit information for requesting automatic execution to the different electronic device together with the content. For example, as illustrated in FIG. 16A, if the user makes a gesture as if grabbing a web page, the first electronic device selects a URL of a corresponding Internet application. Thereafter, as illustrated in FIG. 16B, when the user makes a gesture as if lifting the grabbed web page and then moves to an area out of an upper portion of a screen of the first electronic device, the first electronic device detects that the combined shape is out of sight of the camera in a state where the combined shape of user's fingers is the grabbing shape, and transmits to the second electronic device a selected URL and a signal for requesting automatic execution of the selected URL.

Figure 7B:
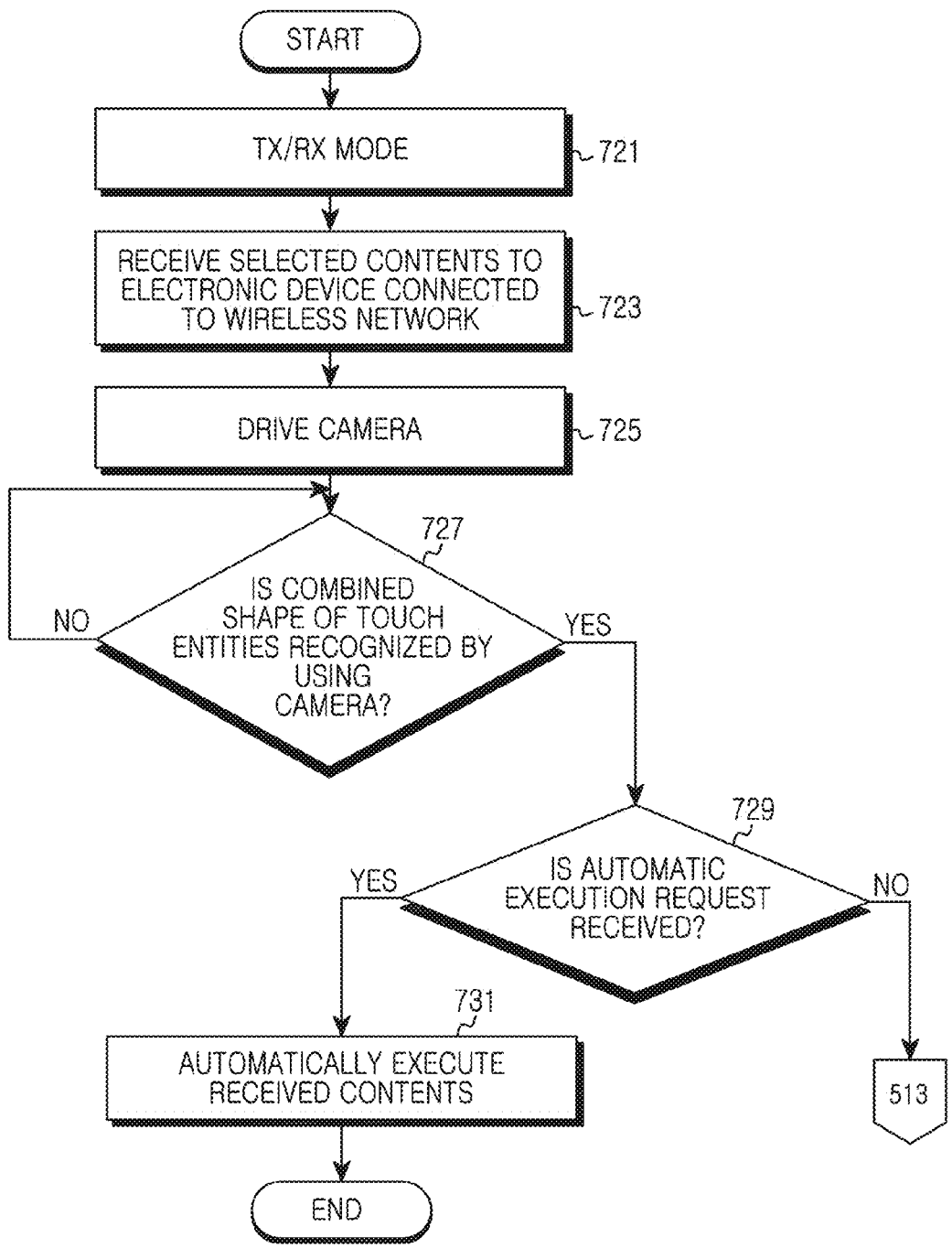
FIG. 7B illustrates a process of receiving content from another device when an electronic device is in a Tx/Rx mode according to an exemplary embodiment of the present invention.

FIG. 7B illustrates a process of receiving content from another device when an electronic device is in a Tx/Rx mode according to an exemplary embodiment of the present invention. FIGS. 16A-16C illustrate an example of executing content in an electronic device by moving the content to another electronic device according to an exemplary embodiment of the present invention.

Referring to FIG. 7B, the electronic device 200 receives a data input for entering the Tx/Rx mode in step 721. The Tx/Rx mode corresponds to a mode for transmitting content selected by the electronic device 200 to a different electronic device or for receiving content from the different electronic device. An electronic device in the Tx/Rx mode may be connected, in advance, to the different electronic device in a wired or wireless fashion.

In step 723, the electronic device 200 receives content from an electronic device connected to a wireless network. In this case, the electronic device 200 temporarily stores the received content.

If the content is received in step 723, the electronic device 200 proceeds to step 725 in which the electronic device 200 drives the camera 230. In this case, upon receiving the content from the electronic device connected to the wireless network, the electronic device 200 may drive the motion sensor 240 to detect touch entities which approach to a pre-set neighbor area of the electronic device 200 and then may drive the camera 230.

In step 727, the electronic device 200 determines whether a combined shape of touch entities is recognized by using the camera 230.

If the electronic device 200 determines that the combined shape of the touch entities is not recognized by using the camera, the electronic device 200 returns to step 727. For example, if the combined shape of the touch entities is not recognized within a specific time period, the electronic device 200 may stop driving of the camera 230 and delete the temporarily stored content.

Meanwhile, if the electronic device 200 determines that the combined shape of the touch entities is recognized by using the camera 230 in step 727, the electronic device 200 proceeds to step 729 in which the electronic device 200 determines whether there is a request for automatically executing the received content. For example, upon receiving the content, the electronic device 200 determines whether a signal or information for requesting the automatic execution of the content is received together. It is assumed herein that the combined shape of the touch entities recognized by using the camera 230 is a grabbing shape.

If the electronic device 200 determines that the automatic execution is requested in step 729, the electronic device 200 proceeds to step 731 in which the electronic device 200 automatically executes the temporarily stored content in step 731.

For example, as illustrated in FIGS. 16A and 16B, if a second electronic device receives a URL and a signal for requesting automatic execution of the URL from a first electronic device in a Tx/Rx mode, the second electronic devices determines a combined shape of user's fingers is the grabbing shape by driving the camera. Thereafter, as illustrated in FIG. 16C, when a user makes a gesture as if releasing a web page by opening the grabbing hand, the second electronic device may recognize that the combined shape of user's fingers recognized by the camera is changed from the grabbing shape to the open-hand shape, and may execute an Internet application to display a web page corresponding to the received URL.

If the electronic device 200 determines that the automatic execution request is not received in step 729, the electronic device 200 returns to step 513 of FIG. 5.

For example, if the second electronic device receives content from the first electronic device in the Tx/Rx mode, as illustrated in FIG. 15B, the second electronic device determines that the combined shape of the user's fingers is the grabbing shape by driving the camera. Thereafter, as illustrated in FIG. 15C, when the user makes a gesture as if releasing content by opening the grabbing hand at a specific location of an upper portion of a screen of the second electronic device, the second electronic device displays the received content by moving the content to a location at which the combined shape of the user's fingers is changed from the grabbing shape to the open-hand shape while displaying the received content according to a location to which the user's finger shape is moved.

Although it is described above that, when the user touches at least two points, the electronic device determines an area corresponding to the touches of the two points and moves content displayed in the touch area, exemplary embodiments of the present invention are not limited thereto, and thus the electronic device may directly receive the touch area input from the user and may move content displayed in the input touch area. For example, the touch area may be determined to a looped curve and a polygon corresponding to a trace of the user touch.

FIGS. 17A-17D illustrate an example of moving an image in such a manner that a user directly determines a desired area of the image in an electronic device according to an exemplary embodiment of the present invention.

Referring to FIG. 17A, if the user desires to move a car image among all images, the user may perform a touch along an outline of a car, and accordingly, the electronic device 200 may determine a car area as a touch area according to a trace of the touch. Thereafter, as illustrated in FIG. 17B, when the user makes a gesture as if grabbing and then lifting the car image, the electronic device 200 detects at least two touches on the car area and a drag thereof, and thereafter detects that a combined shape of user's fingers is a grabbing shape by using the camera 230, and selects the car image displayed in the determined touch area. Thereafter, when the user performs an additional touch by using another hand in a state of lifting the grabbing hand as illustrated in FIG. 17C, the electronic device 200 recognizes an additional touch for a page change in a state in which the grabbing shape is maintained, and displays another image by changing the screen as illustrated in FIG. 17D. Thereafter, as illustrated in FIG. 17D, when the user makes a gesture of opening the grabbing hand at a specific location, the electronic device 200 may display the selected car image by moving the image to a location at which the combined shape of the fingers is changed from the grabbing shape to the open-hand shape.

Figures 18A, 18B, 18C:
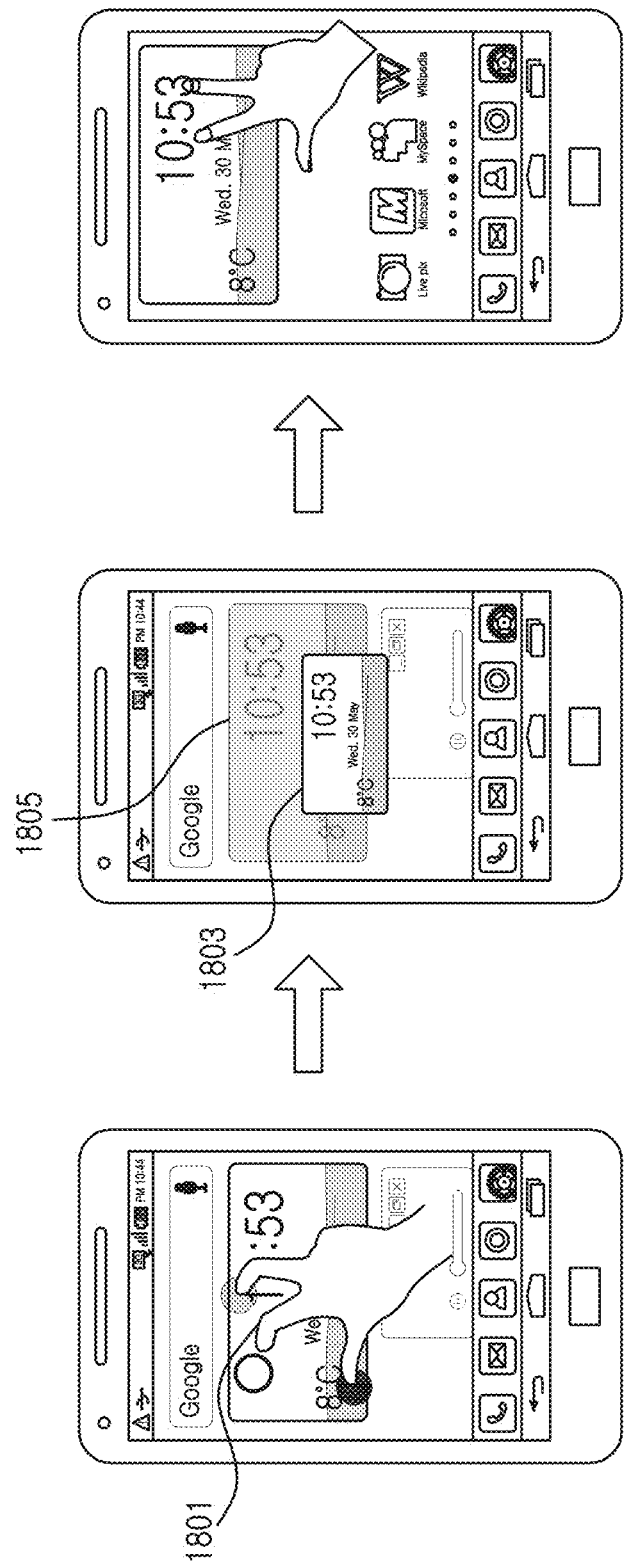
FIGS. 18A-18C illustrates an example of displaying a graphic effect which shows movement of content when the content are moved in an electronic device according to an exemplary embodiment of the present invention.

FIGS. 18A-18C illustrate an example of displaying a graphic effect which shows movement of content when the content are moved in an electronic device according to an exemplary embodiment of the present invention.

Referring to FIGS. 18A-18C, upon detection of at least two touches 1801 on specific content, the electronic device 200 selects the content corresponding to the detected at least two touches 1801. Thereafter, if the detected at least two touches are released, the electronic device 200 recognizes a finger shape located on the touch screen 260 and not in contact with the touch screen 260 by using the camera 230. Thereafter, the electronic device 200 may display the selected content by moving the content on a real-time basis according to a location to which the finger shape recognized by using the camera 260 is moved. In this case, the electronic device 200 may display the content by downsizing the content as illustrated in relation to reference numeral 1803 in order to make an effect of lifting the content while the selected content are moved. In addition, the electronic device 200 may display the content by adding a graphic component 1805, which indicates an initial location, at an initial location of the selected content in order to shows that the selected content are on the move from the initial location to another location. For example, the electronic device 200 may display the selected content and the initial location of the selected content by changing at least one of a size, a color, and an outline according to a pre-set rule.

Exemplary embodiments and all of the functional operations of the present invention described in this specification may be implemented in computer software, firmware, or hardware, including the structures disclosed in this specification and their structural equivalents, or in combinations of one or more of them. Further, the exemplary embodiments of the present invention described in this specification may be executed by one or more computer program products (e.g. an electronic device, a data processing device, and the like), or may be implemented in one or more modules of computer program instructions encoded on a non-transient computer readable medium for controlling an operation of these devices.

The non-transient computer readable medium may be a machine-readable storage medium, a machine-readable storage substrate, a memory device, a composition of matter effecting a machine-readable propagated stream, or a combination of one or more of them. The term "data processing device" includes, for example, a programmable processor, a computer, or multiple processors or all apparatus, devices, and machines for processing data, including the computer. The apparatus may include, in addition to hardware, code that generates an execution environment for the computer program, e.g., code that constitutes processor firmware, a protocol stack, a database management system, an operating system, or a combination of one or more of them.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of an electronic device, the method comprising:

detecting a first gesture subsequent to at least two touches on a touch screen display from a user;
selecting content corresponding to locations at which the at least two touches are detected;
recognizing a lift of the user's hand when the first gesture is released;
detecting a changed location of the selected content according to a movement of the user's hand, while the first gesture is maintained;
detecting that the first gesture has changed to a predetermined gesture; and
moving the selected content to a location where the first gesture was changed to the predetermined gesture.

2. The method of claim 1, further comprising:
if the detected at least two touches are released, detecting an additional touch; and
changing a currently displayed page to another page according to the additional touch.

3. The method of claim 1, wherein the selecting of the content corresponding to the locations at which the at least two touches are detected comprises:
determining a touch area having a shape corresponding to a polygonal or a looped curve including coordinates of two touches among coordinates of the detected at least two touches; and
selecting content displayed in the determined touch area,
wherein the selected content is content present inside the touch area or is displayed inside the touch area by clipping the content to the touch area.

4. The method of claim 1, wherein the selecting of the content corresponding to the locations at which the at least two touches are detected comprises:
determining a touch area having a shape corresponding to a polygonal or a looped curve including coordinates of two touches among coordinates of the detected at least two touches;
detecting a release of the detected at least two touches; and
selecting content displayed in the determined touch area,
wherein the selected content is a part of the content or is the content itself.

5. The method of claim 4, wherein the determining of the touch area having the shape corresponding to the polygonal or the looped curve including the coordinate of two touches among the coordinates of the detected at least two touches comprises:
determining the touch area as corresponding to a rectangle, two vertices of which correspond to coordinates of the detected at least two touches if the detected touch has two coordinates.

6. The method of claim 1, wherein the detecting of the combined shape of the detected touch entities comprises detecting the combined shape of the touch entities by using a camera.

7. The method of claim 1, wherein the moving of the selected content to the location where the first gesture changed to the predetermined gesture comprises:
determining whether the first gesture has changed from a pre-set grabbing shape to an open-hand shape;
detecting a center point of the grabbing shape detected immediately before the combined shape is changed to the open-hand shape; and
moving the selected content to coordinates of the touch screen corresponding to the detected center point by using a mapping relation between the coordinates of the touch screen and each pixel of an image including the first gesture,
wherein the image including the first gesture is an image acquired by using the camera.

8. The method of claim 7, further comprising:
comparing the first gesture with at least one of a pre-set combined shape, coordinates at which the at least two touches are detected, and coordinates of a location at which the detected at least two touches are released; and
determining whether the first gesture is the grabbing shape on the basis of the combination result.

9. The method of claim 1, wherein the moving of the selected content to the location where the first gesture has changed further comprises:
determining whether the first gesture is no longer detected using the motion sensor; and
transmitting the selected content to another electronic device if the first gesture is no longer detected.

10. The method of claim 9, wherein the transmitting of the selected content to another electronic device if the combined shape is no longer detected comprises:
determining whether the combined shape is out of a pre-set neighboring area of the electronic device by using a motion sensor; and
transmitting the selected content to another electronic device if the combined shape is out of the pre-set neighboring area of the electronic device.

11. An apparatus for moving content in an electronic device, the apparatus comprising:
at least one processor;
a camera;
a memory;
a touch screen display; and
at least one program stored in the memory and configured to be executed by the at least one processor,
wherein the at least one program comprises an instruction for detecting a first gesture subsequent to at least two touches on the touch screen display from a user, for selecting content corresponding to locations at which the at least two touches are detected, for recognizing a lift of the user's hand when the first gesture is released, for detecting a changed location of the selected content according to a movement of the user's hand, while the first gesture is maintained, for detecting the first gesture is changed to a predetermined gesture; and moving the selected content to a location where the first gesture changed to the predetermined gesture.

12. The apparatus of claim 11, wherein if the detected at least two touches are released, the at least one program further comprises an instruction for detecting an additional touch, and for changing a currently displayed page to another page according to the additional touch.

13. The apparatus of claim 11,
wherein the at least one program comprises an instruction for determining a touch area having a shape corresponding to a polygonal or a looped curve including coordinates of two touches among coordinates of the detected at least two touches, and for selecting content displayed in the determined touch area, and
wherein the selected content is content present inside the touch area or is displayed inside the touch area by clipping the content to the touch area.

14. The apparatus of claim 11,
wherein the at least one program comprises an instruction for determining a touch area having a shape corresponding to a polygonal or a looped curve including coordinates of two touches among coordinates of the detected at least two touches, for detecting a release of the detected at least two touches, and for selecting content displayed in the determined touch area, and wherein the selected content is a part of the content or is the content itself.

15. The apparatus of claim 14, wherein the at least one program comprises an instruction for determining the touch area as corresponding to a rectangle, two vertices of which correspond to coordinates of the detected two touches if the detected touch has two coordinates.

16. The apparatus of claim 11, wherein the touch entities comprise at least one of a user's finger, a stylus pen, and an extra touch tool.

17. The apparatus of claim 11, wherein the at least one program comprises an instruction for determining whether the first gesture has changed from a pre-set grabbing shape to an open-hand shape, for detecting a center point of the grabbing shape detected immediately before the first gesture changed to the open-hand shape, and for moving the selected content to coordinates of the touch screen corresponding to the detected center point by using a mapping relation between the coordinates of the touch screen and each pixel of an image including the first gesture, and wherein the image including the first gesture is an image acquired by using the camera.

18. The apparatus of claim 17, wherein the at least one program comprises an instruction for comparing the first gesture with at least one of a pre-set combined shape, coordinates at which the at least two touches are detected, and coordinates of a location at which the detected at least two touches are released and thereafter for determining whether the first gesture is the grabbing shape on the basis of the combination result.

19. The apparatus of claim 11, wherein the at least one program comprises an instruction for determining whether the first gesture is no longer detected, for transmitting the selected content to another electronic device if the first gesture is no longer detected, and for moving the selected content to a location at which the first gesture is changed.

20. The apparatus of claim 19, further comprising:

a motion sensor, wherein the program comprises an instruction for determining whether the first gesture is out of a pre-set neighboring area of the electronic device by using a motion sensor, and for transmitting the selected content to another electronic device if the first gesture is out of the pre-set neighboring area of the electronic device.

* * * * *